(12) United States Patent
Sato

(10) Patent No.: US 12,732,107 B2
(45) Date of Patent: Sep. 8, 2026

(54) POWER SUPPLY CONTROL DEVICE AND SWITCHING POWER SUPPLY APPARATUS

(71) Applicant: ROHM CO., LTD., Kyoto (JP)

(72) Inventor: Kiminobu Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 163 days.

(21) Appl. No.: 18/825,055

(22) Filed: Sep. 5, 2024

(65) Prior Publication Data

US 2025/0088113 A1 Mar. 13, 2025

(30) Foreign Application Priority Data

Sep. 7, 2023 (JP) ................................ 2023-144945

(51) Int. Cl.

*H02M 1/00* (2007.01)
*H02M 1/36* (2007.01)
*H02M 3/156* (2006.01)
*H02M 3/158* (2006.01)

(52) U.S. Cl.

CPC ....... *H02M 3/1588* (2013.01); *H02M 1/0009* (2021.05); *H02M 1/36* (2013.01); *H02M 3/156* (2013.01); *H02M 3/158* (2013.01)

(58) Field of Classification Search

CPC ..... H02M 1/0009; H02M 3/156; H02M 3/158
See application file for complete search history.

(56) References Cited

U.S. PATENT DOCUMENTS 9,954,442 B2 * 4/2018 Tsuruyama ......... H02M 3/1588
10,720,839 B1 * 7/2020 Yamada ................ H02M 3/158
2016/0380539 A1 * 12/2016 Fukumoto ........... H02M 3/1588 323/271
2017/0182894 A1 * 6/2017 Yamaguchi ......... H02M 3/1582
2018/0358898 A1 * 12/2018 Yamaguchi ........... H02M 3/156
2021/0249958 A1 * 8/2021 Ida ......................... H03K 19/20
2021/0408913 A1 * 12/2021 Yanagida ............ H02M 1/0025

FOREIGN PATENT DOCUMENTS

JP 2020-089043 6/2020

* cited by examiner

*Primary Examiner* — Gary A Nash
(74) *Attorney, Agent, or Firm* — Fish & Richardson P.C.

(57) ABSTRACT

In a switching power supply apparatus configured to generate an output voltage from an input voltage, the output voltage is obtained by rectifying and smoothing a switch voltage obtained by alternately turned on and off first and second transistors connected in series to each other in accordance with the output voltage. A light-load support circuit includes a reverse current detection circuit that outputs a reverse current detection signal when a magnitude of the switch voltage is lower than an offset voltage during an on period of the second transistor, and an offset correction circuit. In response to the reverse current detection signal, a transition to a specific state occurs, in which the first and second transistors are off. The offset correction circuit corrects the offset voltage on the basis of the switch voltage at a specific timing of being switched to the specific state.

8 Claims, 11 Drawing Sheets

1
VS
Iout
OUT
LD
Vfb
R1
R2
Vout
C1
IL
L1
IN
Vin
SW
GND
MM
MH
Vsw
ML
30
GH
GL
27
DRV
10
SH
SL
ZXOUT
LOGIC
SET
25
26
RST
20
24
SLOPE
Vslp
23
Vcmp
WR21
I21
21
22a
22b
22
Vref
FB

BASIC SWITCHING CONTROL(CONTINUOUS CURRENT MODE)

T1
T2
T3
T4
T5
T6
Vsw
Voffset
Voffset
0V
IL
0A
T3a
T6a
ZXOUT
GH
MH
ON
OFF
ON
OFF
T3b
T6b
GL
ML
OFF
ON
OFF
ON
OFF
37b
OFF
ON
OFF
ON
OFF
0V
Vsh

POWER SUPPLY CONTROL DEVICE AND SWITCHING POWER SUPPLY APPARATUS

CROSS-REFERENCE TO RELATED APPLICATIONS

This nonprovisional application claims priority under 35 U.S.C. § 119(a) on Patent Application No. 2023-144945 filed in Japan on Sep. 7, 2023, the entire contents of which are hereby incorporated by reference.

TECHNICAL FIELD

The present disclosure relates to a power supply control device and a switching power supply apparatus.

RELATED ART

There has been a switching power supply apparatus configured to obtain an output voltage by switching an input voltage using a first transistor and a second transistor connected in series to each other, and rectifying and smoothing a rectangular wave-shaped voltage obtained by the switching using a coil and a capacitor

CITATION LIST

Patent Literature

Patent Document 1: Japanese Patent Application Laid-Open Publication No. 2020-089043

DETAILED DESCRIPTION OF PREFERRED EMBODIMENTS

Detailed Description

Figure 1:
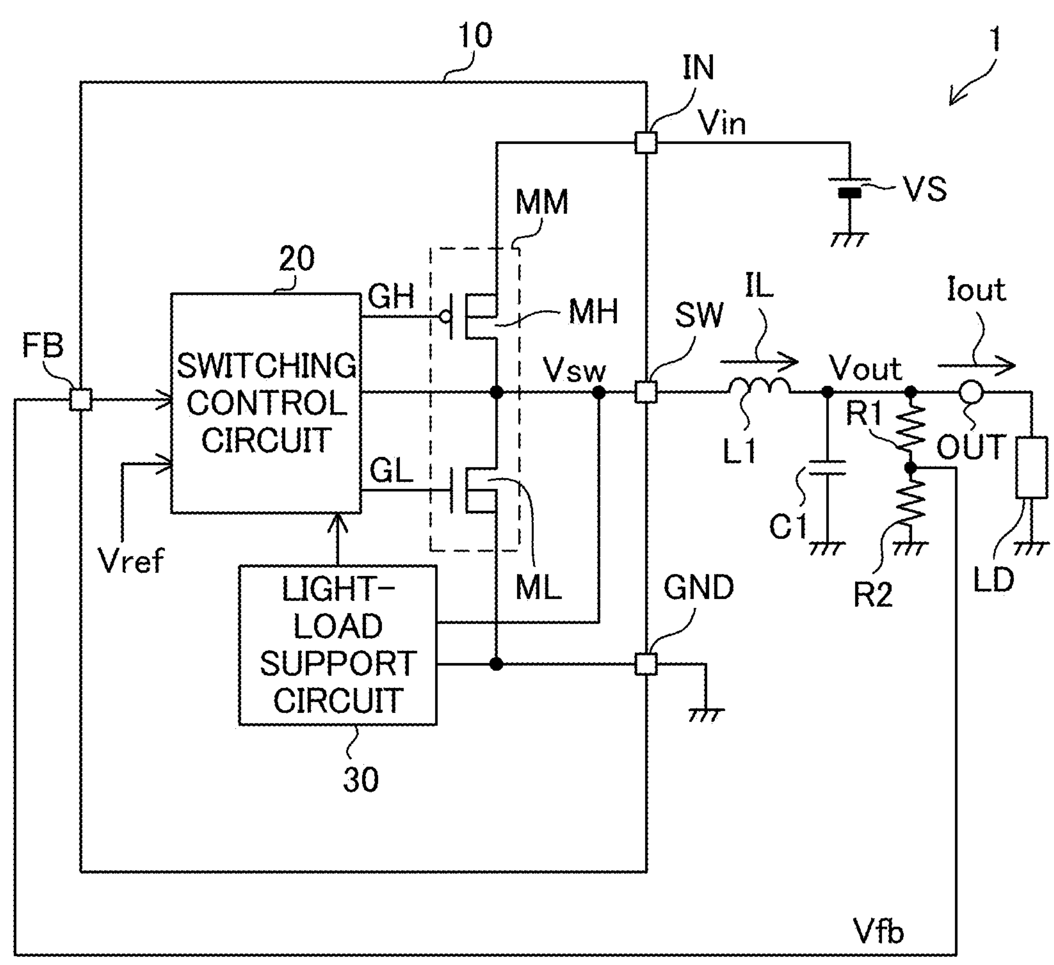
FIG. 1 is a schematic overall configuration diagram of a switching power supply apparatus, which is in accordance with an embodiment of the present disclosure.

Hereinafter, examples of embodiments in the present disclosure will be specifically described with reference to the accompanying drawings. Identical or similar parts are denoted by identical or similar reference numerals in the referenced drawings, and the description related to the identical or similar parts will not be basically repeated. In the present specification, symbols or reference signs for referencing information, signals, physical quantities, functional units, circuits, elements, or parts may be provided in order to omit or abbreviate the names of the information, the signals, the physical quantities, the functional units, the circuits, the elements, or the parts corresponding to the symbols or the reference signs, for the simplification of the description. For example, the slope voltage generation circuit described later and denoted by the reference sign "23" (refer to FIG. 2) is sometimes referred to as the slope voltage generation circuit 23 and other times merely abbreviated to the circuit 23, both referring to the same entity.

First, some terms used in the description of the embodiment in the present disclosure will be defined. A ground denotes a reference conductive portion at a potential of 0 V (zero volt) as a reference or denotes a potential itself of 0 V. A conductor such as metal may be used to form the reference conductive portion. In some cases, the potential of 0 V may be referred to as a ground potential and a voltage of 0 V may be referred to as a ground voltage. In the embodiment in the present disclosure, a voltage indicated without particularly providing a reference represents a potential with respect to the ground.

The term "level" denotes a level of a potential, and a potential of a high level regarding any target signal is higher than a potential of a low level. In any target signal, a switch from the low level to the high level may be referred to as a rise edge, and a switch from the high level to the low level may be referred to as a fall edge.

With respect to any transistor configured as a field-effect transistor (FET) exemplified as a MOSFET, an on state denotes a state in which between a drain and a source of the transistor is conducting, and an off state denotes a state (cut-off state) in which between the drain and the source of the transistor is not conducting. Similar is true for a transistor not classified as a FET. The MOSFET is understood to be an enhancement MOSFET unless otherwise stated. The MOSFET is an abbreviation for a "metal-oxide-semiconductor field-effect transistor." Moreover, it can be understood that, in any MOSFET, a back gate is short-circuited to a source unless otherwise stated.

Any switch can be configured of one or more field effect transistors (FETs), and when a certain switch is the on state, both ends of the aforementioned switch are conducting, while when a certain switch is the off state, both ends of the aforementioned switch is not conducting. Hereinafter, with respect to any transistor or any switch, the on state and the off state thereof are simply expressed respectively as on and off in some cases. Moreover, with respect to any transistor or any switch, a period during which the transistor or the switch is in the on state is referred to as an on period, and a period during which the transistor or the switch is in the off state is referred to as an off period.

With respect to any signal with a signal level in a high or low level, a period during which the level of the signal is the high level is referred to as a high level period, and a period during which the level of the signal is the low level is referred to as a low level period. Similar is true for any voltage with a voltage level in a high level or a low level.

It can be understood that a connection between a plurality of sections forming a circuit, such as any circuit element, any wire, and any node, may denote an electrical connection unless otherwise stated.

Assuming any two voltages to be compared are voltages v1 and v2, "v1>v2" indicates that the voltage v1 is higher than the voltage v2, and "v1<v2" indicates that the voltage v1 is lower than the voltage v2. Similar is true for other equations including physical quantities other than voltage.

FIG. 1 is an overall configuration diagram of a switching power supply apparatus 1 according to the embodiment of the present disclosure. The switching power supply apparatus 1 illustrated in FIG. 1 includes a power supply control device 10 and a plurality of discrete parts externally connected to the power supply control device 10. The plurality of discrete parts includes a coil L1 as an output coil, a capacitor C1 as an output capacitor, and resistors R1 and R2 as feedback resisters. A switching power supply apparatus 1 is configured, as a step-down switching power supply apparatus (a direct current to direct current (DC-DC) converter), to generate a desired output voltage Vout form an input voltage Vin supplied from a voltage source VS. The output voltage Vout appears at an output terminal OUT. Namely, the output terminal OUT is an application end of the output voltage Vout (a terminal to which the output voltage Vout is applied). The output voltage Vout is supplied to a load LD connected to the output terminal OUT. A current supplied to the load LD through the output terminal OUT is referred to as an output current Iout.

Except for a transition state, the input voltage Vin and the output voltage Vout are positive direct-current voltages, and the output voltage Vout is lower than the input voltage Vin. For example, when the input voltage Vin is 12 V, the output voltage Vout can be stabilized at a desired positive voltage value less than 12 V (e.g., 3.3 V or 5 V) by adjusting resistance values of the resistors R1 and R2.

The power supply control device 10 is an electronic component (a semiconductor device) including a semiconductor chip having a semiconductor integrated circuit formed on a semiconductor substrate, a housing (a package) configured to accommodate the semiconductor chip, and a plurality of external terminals exposed from the housing toward an outside of the power supply control device 10. The power supply control device 10 is formed by sealing the semiconductor chip in the housing (package) formed of a resin. FIG. 1 illustrates only an input terminal IN, a switch terminal SW, a feedback terminal FB, and a ground terminal GND as part of the plurality of external terminals provided in the power supply control device 10, but other external terminals are also provided in the power supply control device 10. An output stage MM, a switching control circuit 20, and a light-load support circuit 30 illustrated in FIG. 1 can be configured as a semiconductor integrated circuit.

An external configuration of the power supply control device 10 will now be described. The input voltage Vin is supplied to the input terminal IN from the voltage source VS provided outside the power supply control device 10. The coil L1 is interposed in series between the switch terminal SW and the output terminal OUT. In other words, one end of the coil L1 is connected to the switch terminal SW, and the other end of the coil L1 is connected to the output terminal OUT. Moreover, the output terminal OUT is connected to a ground through the capacitor C1. In other words, one end of the capacitor C1 is connected to the output terminal OUT, and the other end of the capacitor C1 is connected to the ground. Furthermore, the output terminal OUT is connected to one end of the resistor R1, and the other end of the resistor R1 is connected to the ground through the resistor R2. A feedback voltage Vfb appears at a connection node between the resistors R1 and R2. The connection node between the resistors R1 and R2 is connected to the feedback terminal FB, and thereby the feedback voltage Vfb is fed to the feedback terminal FB. The ground terminal GND is connected to the ground.

A current flowing through the coil L1 is referred to as a coil current IL. The coil current IL in a direction from the switch terminal SW toward the output terminal OUT has a positive polarity, and the coil current IL in a direction from the output terminal OUT toward the switch terminal SW has a negative polarity.

An internal configuration of the power supply control device 10 will now be described. The power supply control device 10 includes the output stage MM, the switching control circuit 20, and the light-load support circuit 30.

The output stage MM includes transistors MH and ML. In the configuration example of FIG. 1, the transistor MH is configured of a p-channel MOSFET, and the transistor ML is configured of an n-channel MOSFET. The transistors MH and ML are a pair of switching elements connected in series between the input terminal IN and the ground terminal GND (in other words ground), and when the transistors MH and ML are subjected to switching driving, the input voltage Vin is switched, and a rectangular wave-shaped switch voltage Vsw appears at the switch terminal SW. The transistor MH is provided on a higher potential side than the transistor ML. Specifically, a source of the transistor MH is connected to the input terminal IN, which is an application end of the input voltage Vin, and receives a supply of the input voltage Vin. A drain of the transistor MH and a drain of the transistor ML are commonly connected to the switch terminal SW. A source of the transistor ML is connected to the ground terminal GND (therefore is connected to the ground). However, a resistor for current detection may be inserted between the source of the transistor ML and the ground terminal GND.

The transistor MH functions as an output element (an output transistor) and the transistor ML functions as a rectifier element (a synchronous rectifier transistor). In the switching driving of the output stage MM, the output element (MH) and the rectifier element (ML) are alternately turned on and off. The coil L1 and the capacitor C1 constitute a rectifier/smoothing circuit configured to rectify and smooth the rectangular wave-shaped switch voltage Vsw which appears at the switch terminal SW to generate the output voltage Vout. The resistors R1 and R2 constitute a feedback voltage generation circuit configured to divide the output voltage Vout to generate the feedback voltage Vfb according to the output voltage Vout. The feedback voltage Vfb is proportional to the output voltage Vout, and as the output voltage Vout rises and falls, the feedback voltage Vfb also rises and falls.

It is to be noted that it may be modified such that the output voltage Vout itself is used as the feedback voltage Vfb. Anyway, the feedback voltage Vfb is a voltage according to the output voltage Vout. Alternatively, the feedback voltage generation circuit (R1, R2) may be provided inside the power supply control device 10, in which case the feedback terminal FB is not an external terminal but a node inside the power supply control device 10.

Gate signals GH and GL are respectively supplied as drive signals to gates of the transistors MH and ML, and the transistors MH and ML are turned on and off in accordance with the gate signals GH and GL. When the gate signal GH is at a low level, the transistor MH is in an on state, and when the gate signal GH is at a high-level, the transistor MH is in an off state. The low-level gate signal GH has a ground potential or has a potential sufficiently lower than the input voltage Vin. The high-level gate signal GH has a potential of the input voltage Vin. When the gate signal GL is at a high level, the transistor ML is in an on state, and when the gate signal GL is at a low level, the transistor ML is in an off state. The high-level gate signal GL has the potential of the input voltage Vin or has a potential sufficiently higher than the ground potential. The low-level gate signal GL has the ground potential.

The transistors MH and ML are basically turned on and off alternately, but there are also cases where both the transistors MH and ML are kept in the off state. Namely, the state of the output stage MM is one of a high-output state, a low-output state, and a Hi-Z state. In the high-output state, the transistor MH is in the on state and the transistor ML is in the off state. In the low-output state, the transistor MH is in the off state and the transistor ML is in the on state. In the Hi-Z states, both the transistors MH and ML are in the off states. The transistors MH and ML are never in the on state simultaneously.

At least one of the output elements (MH) and the rectifier element (ML) may be provided outside the power supply control device 10. There are also cases where the entire output stage MM may be provided outside the power supply control device 10. The transistor MH may be configured as an N-channel MOSFET, and in this case, a well-known bootstrap circuit (not illustrated) may be used to form a step-up electronic power supply for generating the gate signal GH.

In the on period of the transistor MH, the coil current IL flows through a channel (between the drain and the source) of the transistor MH. In the off period of the transistor MH, the coil current IL flows through a channel of the transistor ML or a parasitic diode of the transistor ML.

The switching control circuit 20 is connected to the feedback terminal FB and receives the feedback voltage Vfb from the feedback terminal FB. Moreover, a reference voltage generation circuit (not illustrated) configured to generate a reference voltage Vref on the basis of the input voltage Vin is provided in the power supply control device 10, and the reference voltage Vref is supplied to the switching control circuit 20. The reference voltage Vref has a predetermined positive direct-current voltage value. The switching control circuit 20 controls on/off states of the transistors MH and ML respectively through level control of the gate signals GH and GL on the basis of the feedback voltage Vfb and the reference voltage Vref, thereby generating a desired output voltage Vout to the output terminal OUT. In this case, the switching control circuit 20 performs switching driving of the output stage MM so that a difference between the feedback voltage Vfb and the reference voltage Vref is reduced, in other words, performs the switching driving of the output stage MM so that the feedback voltage Vfb is matched to the reference voltage Vref. When the feedback voltage Vfb is matched to the reference voltage Vref, the output voltage Vout has a voltage value according to "Vout=Vref×(R1+R2)/R2".

Further with reference to an information on coil current IL, the switching control circuit 20 may perform switching driving of an output stage MM, i.e., may perform switching driving of an output stage MM by current-mode control. Alternatively, the switching control circuit 20 may perform the switching driving of the output stage MM using pulse frequency modulation (i.e., by a constant on-time scheme) instead of pulse width modulation. Anyway, the power supply control device 10 controls an operation of the switching power supply apparatus 1 through the control of the output stage MM on the basis of the output voltage Vout (specifically, on the basis of the feedback voltage Vfb according to the output voltage Vout).

When the load LD is relatively light (i.e., when the output current Iout is relatively small), the light-load support circuit 30 performs a process for suppressing a reverse flow of the coil current IL, details of which will be described later.

Figure 2:
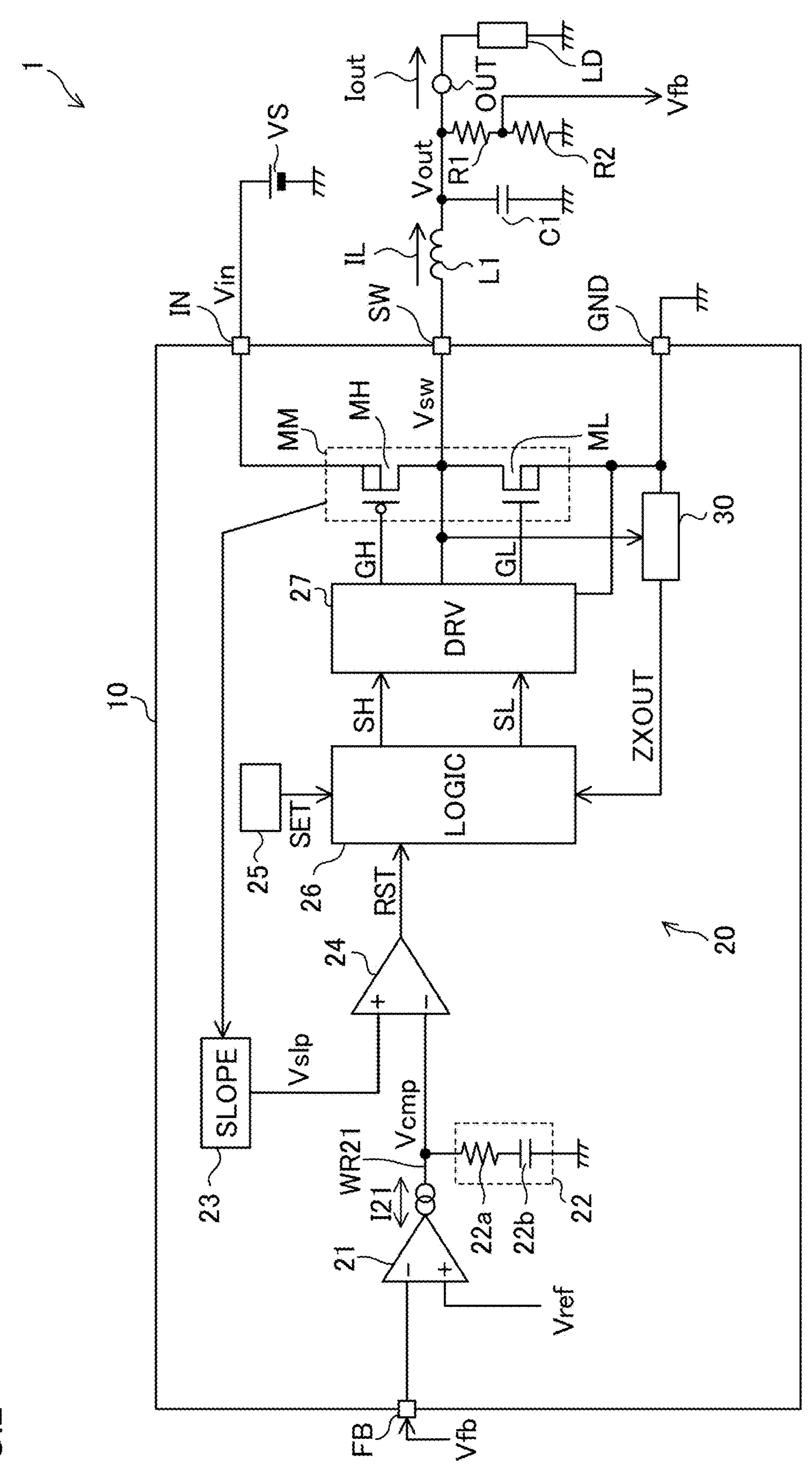
FIG. 2 is an overall configuration diagram of the switching power supply apparatus including an example of an internal configuration of a power supply control device, which is in accordance with the embodiment of the present disclosure.

FIG. 2 illustrates an example of an internal configuration of the switching control circuit 20. In the following, unless otherwise specified, it is assumed that the switching control circuit 20 has the internal configuration as illustrated in FIG. 2. The switching control circuit 20 illustrated in FIG. 2 performs switching driving of the output stage MM through current-mode control. Each circuit in the power supply control device 10 is driven on the basis of the input voltage Vin or on the basis of an internal power supply voltage generated in the power supply control device 10 from the input voltage Vin.

The switching control circuit 20 includes an error amplifier 21, a phase compensation circuit 22, a slope voltage generation circuit 23, a reset comparator 24, a set signal generation circuit 25, a logic circuit 26, and a driver 27. Signals RST, SET, and SH, SL, and ZXOUT described below are binary signals, each which take a high or low signal level. The signal SET functions as a set signal, and the signal RST functions as a reset signal. Alternatively, it may be considered that only the high level signal SET functions as the set signal, and only the high level signal RST functions as the reset signal.

The error amplifier 21 is a current output type transconductance amplifier. The error amplifier 21 includes an inverting input terminal, a non-inverting input terminal, and an output terminal. The inverting input terminal of the error amplifier 21 is connected to the feedback terminal FB and receives the feedback voltage Vfb. The predetermined reference voltage Vref is supplied to the non-inverting input terminal of the error amplifier 21. As described above, the reference voltage Vref is a direct current voltage having a positive predetermined voltage value and is generated in the reference voltage generation circuit, which is not illustrated, in the power supply control device 10. The output terminal of the error amplifier 21 is connected to a wiring WR21 (an error output wiring).

The error amplifier 21 outputs a current signal 121 according to a difference between the feedback voltage Vfb and the reference voltage Vref from its output terminal, thereby generating a voltage according to the difference between the feedback voltage Vfb and the reference voltages Vref at the wiring WR21. The voltage applied to the wiring WR21 is an error voltage Vcmp. However, the error voltage Vcmp may be a voltage obtained by level-shifting the voltage applied to the wiring WR. An electric charge attributable to the current signal 121 is supplied/retrieved to/from the wiring WR21. Specifically, when the feedback voltage Vfb is lower than the reference voltage Vref, the error amplifier 21 outputs a current attributable to the current signal 121 from the error amplifier 21 toward wiring WR21 so that the potential of wiring WR21 increases, and when the feedback voltage Vfb is higher than the reference voltage Vref, the current attributable to the current signal 121 is drawn in from the wiring WR21 toward the error amplifier 21 so that the potential of wiring WR21 decreases. As an absolute value of the difference between the feedback voltage Vfb and the reference voltage Vref increases, magnitude of the current attributable to the current signal 121 also increases.

At start-up of the power supply control device 10, a soft-starting voltage to be gradually raised from 0 V toward a voltage exceeding the reference voltage Vref may be generated in a power supply control device 10. In this case, the error amplifier 21 compares the lower of the reference voltage Vref and the soft-starting voltage with the feedback voltage Vfb and generates the current signal 121 on the basis of a comparison result thereof. However, in the present embodiment, a state after the soft-starting voltage becomes higher than the reference voltage Vref shall be considered, and the presence of the soft-starting voltage shall be ignored hereafter.

The phase compensation circuit 22 is provided between the wiring WR21 and the ground, and is fed with the input current signal 121 to compensate a phase of the voltage at the wiring WR21 (a phase of the error voltage Vcmp). The phase compensation circuit 22 includes a series circuit of a resistor 22*a* (a phase compensation resistor) and a capacitor 22*b* (a phase compensation capacitor). Specifically, one end of the resistor 22*a* is connected to the wiring WR21, and the other end of the resistor 22*a* is connected to the ground through the capacitor 22*b*. By appropriately setting a resistance value of the resistor 22*a* and an electrostatic capacity value of the capacitor 22*b*, the phase of the voltage at the wiring WR21 (the phase of the error voltage Vcmp) can be compensated, and thereby an oscillation of an output feedback loop can be prevented.

The slope voltage generation circuit 23 generates and outputs a slope voltage Vslp having a ramp waveform. The slope voltage Vslp has information indicating a value of the coil current IL (hereinafter, referred to as current information on the coil L1). Specifically, the circuit 23 generates a sense voltage proportional to a current flowing through the transistor MH (therefore, coil current IL) during the on period of the transistor MH, and a ramp voltage gradually increases from 0 V during the on period of the transistor MH. The circuit 23 generates a voltage obtained by adding the ramp voltage to the sense voltage (i.e., a sum of the sense voltage and the ramp voltage) during the on period of the transistor MH as the slope voltage Vslp. Therefore, during the on period of transistor MH, the slope voltage Vslp monotonically raises. By addition the ramp voltage, a subharmonic oscillation which may occur in the current-mode control can be suppressed.

As long as the sense voltage has the current information on the coil L1, the sense voltage may be generated in any manner. For example, it may be configured to generate the sense voltage by detecting the current flowing through the transistor ML (therefore, the coil current IL) during the on period of the transistor ML. Alternatively, it may be configured to generate the sense voltage by directly detecting the coil current IL by a current sensor. The slope voltage Vslp may function in a significant way only during the on period of the transistor MH, and the slope voltage Vslp may be fixed to 0 V during the off period of the transistor MH.

The error voltage Vcmp and the slope voltage Vslp are supplied to the reset comparator 24. The reset comparator 24 generates and outputs a signal RST on the basis of the error voltage Vcmp and the slope voltage Vslp. In the reset comparator 24, the inverting input terminal is connected to the wiring WR21 to receive the error voltage Vcmp, and the non-inverting input terminal receives the slope voltage Vslp. Therefore, the reset comparator 24 outputs the low level signal RST when "Vcmp>Vslp" holds and outputs the high level signal RST when "Vcmp<Vslp" holds. When "Vcmp=Vslp" holds, the signal RST is at the low level or the high level.

Figure 3:
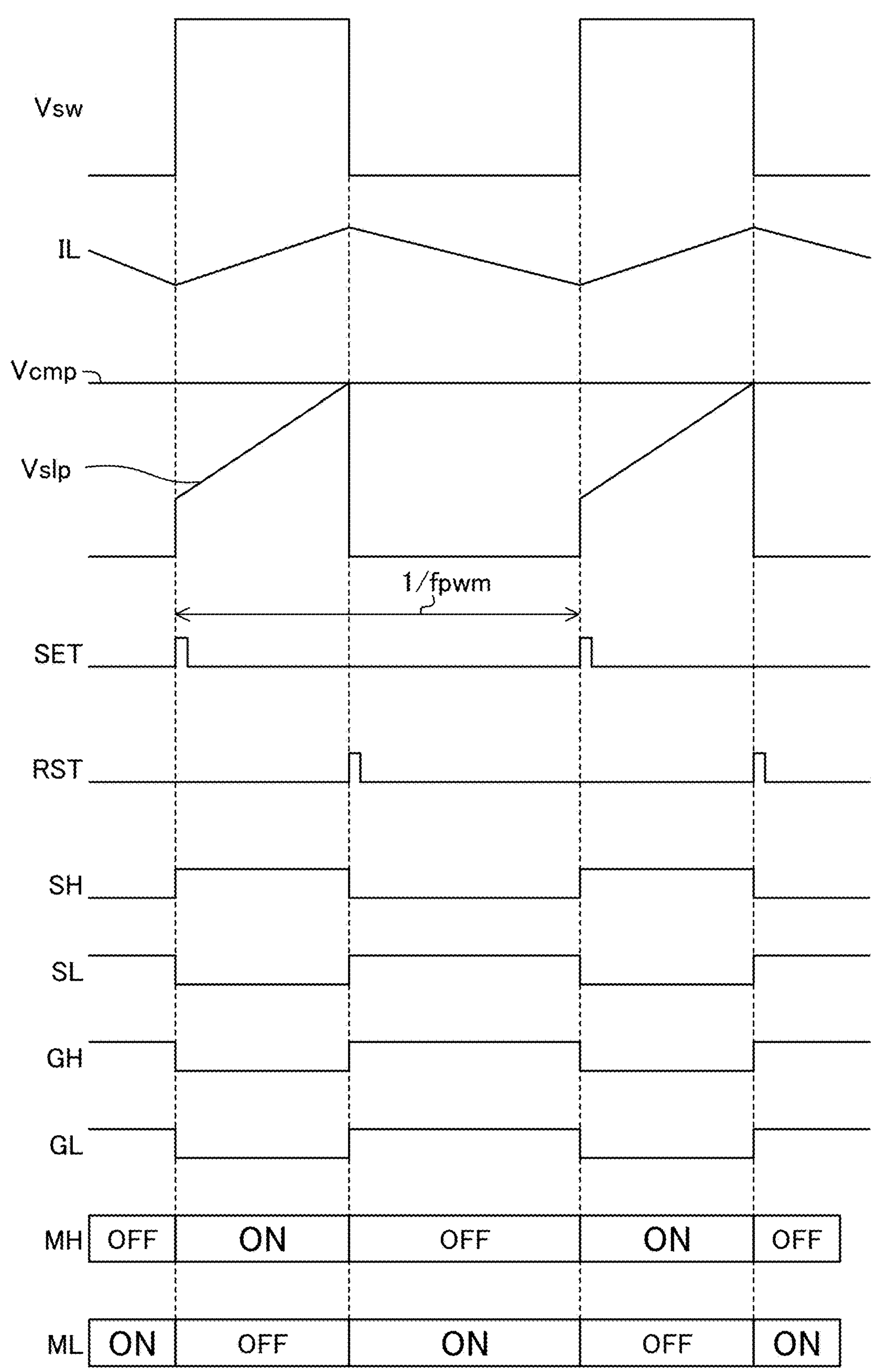
FIG. 3 is a timing chart in basic switching control, which is in accordance with the embodiment of the present disclosure.

FIG. 3 illustrates waveforms of several signals including the signal RST. During the on period of transistor MH, the slope voltage Vslp monotonically raises. When being switched from the state of "Vcmp>Vslp" to the state of "Vcmp<Vslp" during the rise of the slope voltage Vslp, the reset comparator 24 generates a rise edge in the signal RST. Since the rise edge of the signal RST triggers a transition to the off period of the transistor MH and the slope voltage Vslp returns to 0 V, the high level period of the signal RST is a momentary period. Except for special states such as immediately after power applied to the power supply control device 10, "Vcmp>0" holds.

The set signal generation circuit 25 generates and outputs the signal SET having a predetermined frequency fpwm. The signal SET is a signal in which a pulse occurs at the frequency fpwm. Namely, the pulse which remains at the high level occurs in the signal SET for a momentary period, for every period of the signal SET. An oscillator configured to oscillate at the frequency fpwm can be used for forming the set signal generation circuit 25. A length of one period of the signal SET is the reciprocal of the frequency fpwm. The rise edges occur in the signal SET at intervals of the reciprocal of the frequency fpwm. Hereinafter, the reciprocal of the frequency fpwm is referred to as a switching period.

The logic circuit 26 generates and outputs control signals SH and SL on the basis of the signals SET and RST. As illustrated in FIG. 3, the logic circuit 26 generates a rise edge in the control signal SH and generates a fall edge in the control signal SL triggered by the rise edge of the signal SET; and generates a fall edge in the control signal SH and generates a rise edge in the control signal SL triggered by the rise edge of the signal RST. It is to be noted that when a high level signal ZXOUT is fed to the logic circuit 26 after generating the rise edge in the control signal SL triggered by the rise edge of the signal RST, the logic circuit 26 generates the fall edge in the control signal SL, without waiting for the next rise edge of the signal SET.

The driver 27 is connected to each gate of the transistors MH and ML, the switch terminal SW, and the ground terminal GND. The driver 27 supplies the gate signals GH and GL according to the control signals SH and SL to gates of the transistors MH and ML, respectively, thereby turning on or off the transistors MH and ML individually. The driver 27 sets the gate signal GH as the low level to turn on the transistor MH when the control signal SH is at the high level, and sets the gate signal GH as the high level to turn off the transistor MH when the control signal SH is at the low level. The driver 27 sets the gate signal GL as the high level to turn on the transistor ML when the control signal SL is at the high level, and sets the gate signal GL as the low level to turn off the transistor ML when the control signal SL is at the low level.

The logic circuit 26 does not simultaneously set both the control signals SH and SL as the high level. Therefore, the transistor ML is always off during the on period of the transistor MH, and the transistor MH is always off during the on period of the transistor ML.

The light-load support circuit 30 includes a reverse current detection circuit configured to detect the presence or absence of a reverse current and generates the signal ZXOUT indicating a detection result thereof. The signal ZXOUT is supplied to the logic circuit 26. The reverse current is a current flowing from the switch terminal SW into the ground through the transistor ML and corresponds to the negative coil current IL. In a light-load state where the load LD is relatively light (i.e., in a state where the output current Iout is relatively small), such a reverse current may occur. When the reverse current flows through the transistor ML, efficiency of the switching power supply apparatus 1 is reduced. The transistor ML is switched from on to off to cut off the reverse current when the reverse current is detected, thereby improving the efficiency in the light-load state.

The switching control circuit 20 illustrated in FIG. 2 performs the switching driving of the output stage MM by performing PWM control. The PWM is an abbreviation for Pulse Width Modulation. FIG. 3 is a timing chart of basic switching control performed by the switching control circuit 20. The basic switching control is PWM control performed in a continuous current mode. In the continuous current mode, the coil current IL always flows from the switch terminal SW toward the output terminal OUT. In the basic switching control, the switching driving is periodically performed for the transistors MH and ML to be alternately turned on and off at the frequency fpwm.

In the basic switching control, the control signals SH and SL are pulse width modulation signals having the frequency fpwm. In the basic switching control, the switching driving of the transistors MH and ML is performed at the frequency fpwm, so that the switch voltage Vsw has the frequency fpwm. Namely, the switching frequency of the output stage MM is matched to the frequency fpwm, in the basic switching control.

An increase in the output current Iout leads to a decrease in the output voltage Vout, and the decrease in the output voltage Vout from a viewpoint of a target voltage Vtg causes an increase in the error voltage Vemp. A decrease in the output current Iout leads to an increase in the output voltage Vout, and the increase in the output voltage Vout from the viewpoint of the target voltage Vtg causes a decrease in the error voltage Vcmp. The reset comparator 24 generates the signal RST on the basis of the error voltage Vemp and the slope voltage Vslp so that on-duty increases in response to the increase of the error voltage Vemp and on-duty decreases in response to the decreasing of the error voltage Vcmp. The output voltage Vout is stabilized at the target voltage Vtg by adjusting the on-duty as described above. The target voltage Vtg is expressed as "Vtg=Vref×(R1+R2)/R2". The on-duty represents a ratio of a length of the on period of the transistor MH to a sum of the length of the on period of transistor MH and a length of the off period of the transistor MH.

Reference Example

Figure 4:
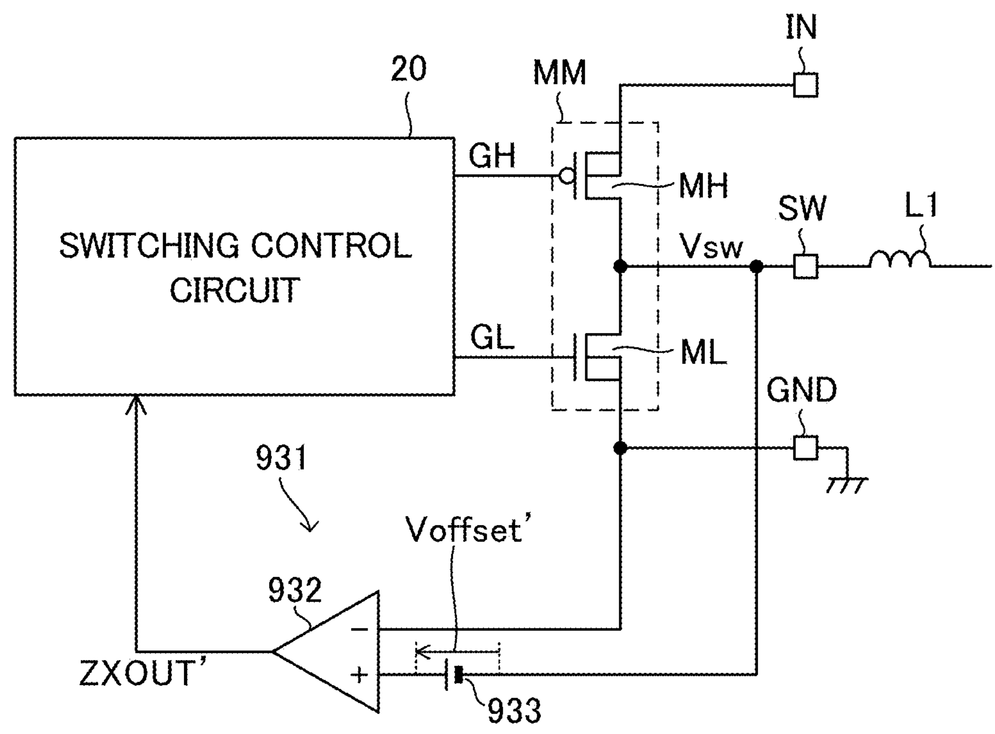
FIG. 4 is a diagram illustrating a reverse current detection circuit according to a reference example and a peripheral circuit thereof.

FIG. 4 illustrates a reverse current detection circuit 931 according to a reference example. The reverse current detection circuit 931 includes a reverse current detection comparator 932 and an offset voltage output circuit 933. The reverse current detection comparator 932 is a circuit for detecting whether or not a reverse current is detected, and is configured to output the signal ZXOUT', which becomes active at a timing when the reverse current is detected, thereby leading the output stage MM to a Hi-Z state.

When generating the signal ZXOUT' on the basis of a magnitude relationship between the switch voltage Vsw and the ground voltage simply, an error occurs with respect to an ideal of switching the output stage MM from the low-output state to the Hi-Z state at a timing when the reverse current is detected.

A first factor of the error is the presence of a delay time tdly involved in the detection and the control. The delay time tdly involved in the detection and the control corresponds to a delay time from the timing (i.e., the start timing of generating the reverse current) when the polarity of the switch voltage Vsw is switched from negative to positive to the timing when the output stage MM is switched to the Hi-Z state.

A second factor of the error is that accuracy of the reverse current detection comparator 932 is not ideal. An input offset voltage of the reverse current detection comparator 932 belongs to the second factor of the error.

In order to address the first factor of the error, an offset voltage output circuit 933 is provided in the reverse current detection circuit 931 according to the reference example, and the reverse current detection comparator 932 detects the presence or absence of the reverse current by comparing the voltage (Vsw+Voffset') with the ground voltage. The offset voltage output circuit 933 is a voltage source configured to generate the offset voltage Voffset'.

Figure 5:
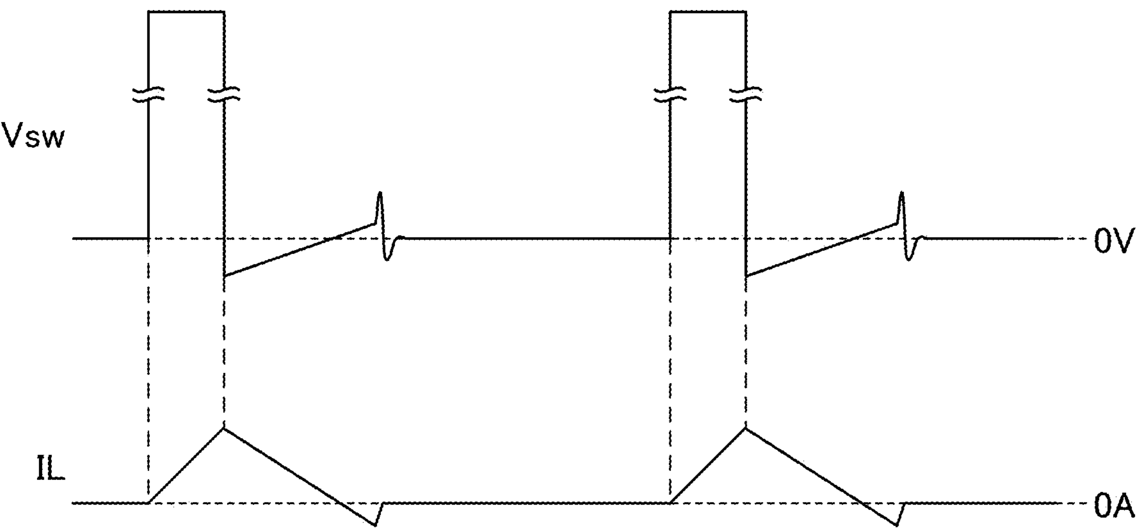
FIG. 5 is a diagram illustrating an operation of the reverse current detection circuit according to the reference example.
Figure 6:
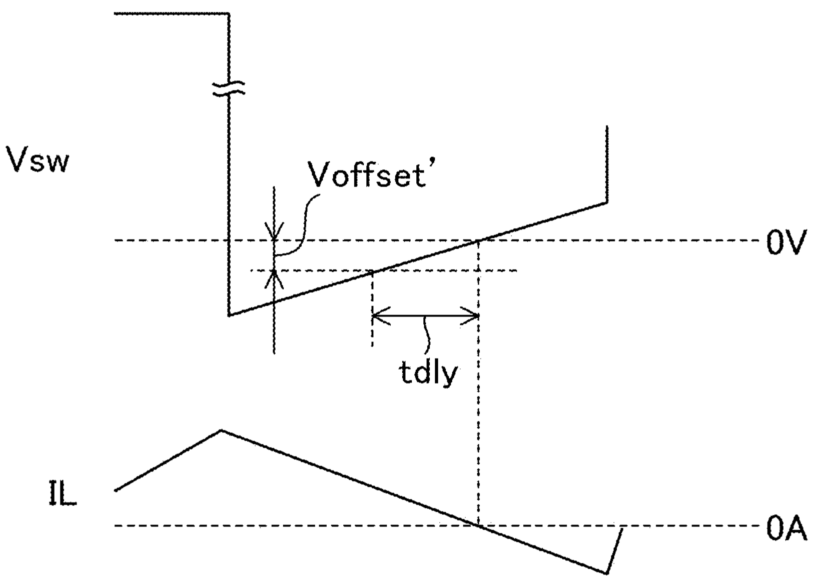
FIG. 6 is a diagram illustrating an operation of the reverse current detection circuit according to the reference example.

An optimum value of the offset voltage Voffset' will now be described with reference to FIGS. 5 and 6. FIGS. 5 and 6 illustrate waveforms of the switch voltage Vsw and the coil current IL according to the reference example. FIG. 5 illustrates the waveforms of the switch voltage Vsw and the coil current IL in a light-load state for a plurality of periods. FIG. 6 illustrates magnified waveforms of the switch voltage Vsw and the coil current IL when the switch voltage Vsw has a value near 0 V.

The optimal offset voltage Voffset' is expressed by an equation "Voffset'=tdly×(Vout/L1)×Ron".

In the aforementioned equation, L1 denotes an inductance value of the coil L1, and Ron denotes an on-resistance of the transistor ML. (Vout/L1) corresponds to a slope of the coil current IL during the on period of the transistor ML.

If the offset voltage Voffset' can be set to satisfy the above-described equation, the output stage MM can be switched from the low-output state to the Hi-Z state at the timing when the polarity of the switch voltage Vsw is switched from negative to positive.

However, the delay time tdly variously varies under an influence of an ambient temperature. Moreover, the slope of the coil current IL variously varies under an influence of the output voltage Vout and the inductance value of the coil L1. Furthermore, the on-resistance Ron variously varies under an influence of the ambient temperature. When the input voltage Vin is used as the high-level gate signal GL, the on-resistance Ron is also under an influence of input voltage Vin. Thus, the optimum value of the offset voltage Voffset' is not uniquely determined. That is, it is difficult for the reverse current detection circuit 931 according to the reference example to optimize the offset voltage Voffset' in accordance with various conditions.

A configuration, an operation, and the like of the light-load support circuit 30, in which these circumstances are taken into account, will now be described through the following plurality of practical examples. Unless otherwise stated or unless inconsistent, any features described above in connection with the embodiment (however, except for the features in regard of the reference example) apply to the practical examples described below. For any features of the practical examples that contradict what has been described above, their description given in connection with the practical examples may prevail. Unless inconsistent, any features of any of the plurality of practical examples can be applied to any other practical example (i.e., any two or more of the plurality of practical examples can be implemented in any combination thereof).

First Practical Example

Figure 7:
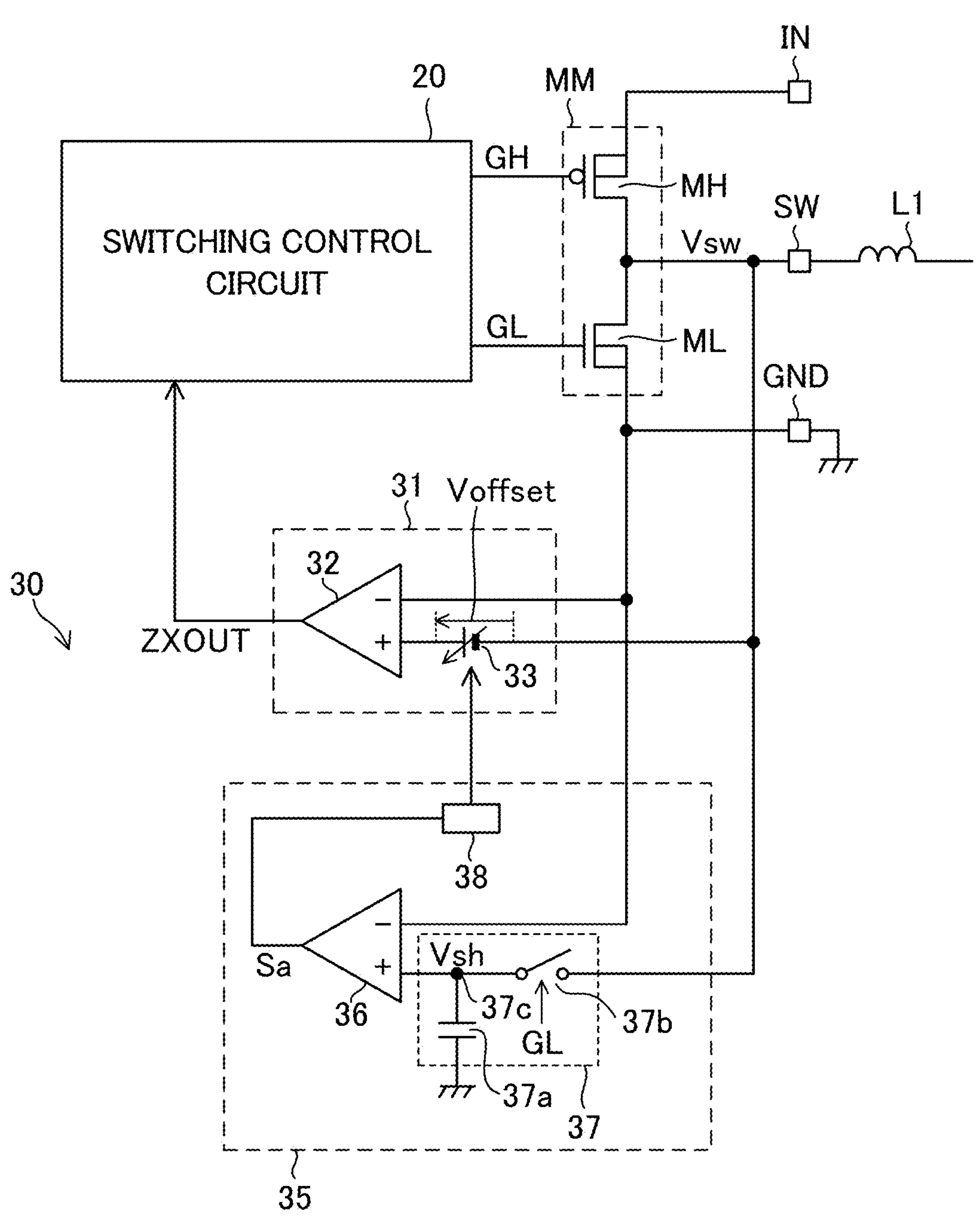
FIG. 7 is a diagram illustrating a light-load support circuit and a peripheral circuit thereof, which is in accordance with a first practical example belonging to the embodiment of the present disclosure.

A first practical example will now be described. FIG. 7 illustrates an internal configuration of the light-load support circuit 30 according to the first practical example and peripheral circuits thereof. The light-load support circuit 30 according to the first practical example includes a reverse current detection circuit 31 and an offset correction circuit 35. The reverse current detection circuit 31 includes a reverse current detection comparator 32 and an offset voltage output circuit 33. The offset correction circuit 35 includes a correction comparator 36, a sample-and-hold circuit 37, and an adjustment circuit 38. The sample-and-hold circuit 37 includes a capacitor 37*a* and a switch 37*b*.

The comparators 32 and 36 each have an inverting input terminal, a non-inverting input terminal, and an output terminal. However, as will be discussed below, the reverse current detection comparator 32 operates at a higher speed than the correction comparator 36, and the correction comparator 36 performs a more accurate comparison operation than the reverse current detection comparator 32.

The offset voltage output circuit 33 generates and outputs an offset voltage Voffset. The offset voltage output circuit 33 includes a negative-side terminal and a positive-side terminal, and outputs, from the positive-side terminal, a voltage higher than a voltage at the negative-side terminal by the offset voltage Voffset. The offset voltage Voffset has a positive voltage value. The negative-side terminal of the offset voltage output circuit 33 is connected to a switch terminal SW, and the positive-side terminal of the offset voltage output circuit 33 is connected to the non-inverting input terminal of the reverse current detection comparator 32. Therefore, a voltage (Vsw+Voffset) is supplied to the non-inverting input terminal of the reverse current detection comparator 32 from the offset voltage output circuit 33. The voltage (Vsw+Voffset) is a voltage higher than the switch voltage Vsw by the offset voltage Voffset.

The inverting input terminal of the reverse current detection comparator 32 is connected to a source of the transistor ML (therefore, is connected to a ground). The reverse current detection comparator 32 compares a voltage at its inverting input terminal with a voltage at its non-inverting input terminal and outputs a signal ZXOUT according to a comparison result thereof from its output terminal. Specifically, the reverse current detection comparator 32 compares the voltage (Vsw+Voffset) with a ground voltage and outputs a high level signal ZXOUT when the voltage (Vsw+Voffset) is higher than the ground voltage, and outputs a low level signal ZXOUT when the voltage (Vsw+Voffset) is lower than the ground voltage. When the voltage (Vsw+Voffset) is matches to the ground voltage, the reverse current detection comparator 32 outputs the high level or low level signal ZXOUT.

A reverse current detection comparator 32 has a function of detecting whether a magnitude of the switch voltage Vsw is lower than the offset voltage Voffset during the on period of the transistor ML, and outputs the high level signal ZXOUT when the magnitude of the switch voltage Vsw is lower than the offset voltage Voffset. The signal ZXOUT is fed to the switching control circuit 20. In the switching control circuit 20 illustrated in FIG. 2, the signal ZXOUT is fed to the logic circuit 26.

Only during the on period of the transistor ML, the signal ZXOUT has significant information. During a period when the output stage MM is in the high-output state and the Hi-Z state, the signal ZXOUT has no significant information and the signal ZXOUT during the aforementioned period is ignored by the logic circuit 26. The high level signal ZXOUT corresponds to a reverse current detection signal indicating a reverse current occurs during the on period of the transistor ML. The low level signal ZXOUT does not correspond to the reverse current detection signal. The reverse current detection comparator 32 outputs the reverse current detection signal when the magnitude (absolute value) of the switch voltage Vsw is lower than the offset voltage Voffset during the on period of the transistor ML. During the on period of the transistor ML, a rise edge of the signal ZXOUT represents a switch from a non-occurrence state of the reverse current (i.e., a state in which no reverse current occurs) to an occurrence state of the reverse current (i.e., a state in which the reverse current occurs). The signal ZXOUT during the off period of the transistor ML does not correspond to the reverse current detection signal, regardless of the level of the signal ZXOUT.

The switching control circuit 20 switches the state of the output stage MM from the low-output state to the Hi-Z state by immediately switching the gate signal GL to the low level when receiving the high level signal ZXOUT during the high level period of the gate signal GL. Namely, the switching control circuit 20 switches the transistor ML from off to on through the switching driving of the output stage MM, and then when receiving the high level signal ZXOUT from the reverse current detection comparator 32, switches the state of the output stage MM from the low-output state to the Hi-Z state by switching the transistor ML to off. When the configuration illustrated in FIG. 2 is adopted, the transistor ML is switched from off to on through the switching driving of the output stage MM, and then when the high level signal ZXOUT from the reverse current detection comparator 32 is fed to the logic circuit 26, the logic circuit 26 generates the fall edge on the control signal SL without waiting for the next rise edge of the signal SET. Consequently, the state of the output stage MM is switched from the low-output state to the Hi-Z state.

The offset voltage output circuit 33 is a variable voltage source configured to be capable of changing a value of the offset voltage Voffset. The offset voltage Voffset is adjusted by the adjustment circuit 38 on the basis of an output signal from the correction comparator 36. At start-up of the power supply control device 10, the offset voltage Voffset has a positive predetermined initial voltage value Vinit.

In the sample-and-hold circuit 37, a first end of the switch 37*b* is connected to a switch terminal Vsw, and a second end of the switch 37*b* is connected to a node 37*c*. The capacitor 37*a* is provided between the node 37*c* and the ground. Namely, a first end of the capacitor 37*a* is connected to the node 37*c*, and the second end of the capacitor 37*a* is connected to the ground. A voltage at the node 37*c* is referred to as a voltage Vsh.

The gate signal GL is supplied to a control terminal of the switch 37*b*, and the switch 37*b* is controlled to be turned on or off in accordance with the gate signal GL. When the gate signal GL has the high level, the switch 37*b* is on, and when the gate signal GL has the low level, the switch 37*b* is off. It may be configured so that the switch 37*b* is controlled to be turned on or off in accordance with the control signal SL (refer to FIG. 2). In this case, when the control signal SL has the high level, the switch 37*b* is on, and when the control signal SL has the low level, the switch 37*b* is off. Anyway, the switch 37*b* is set on/off in synchronization with the on/off of the transistor ML. Namely, the switch 37*b* is on during the on period of the transistor ML (in detail, during the period when the transistor ML is controlled to be on), and the switch 37*b* is off during the off period of the transistor ML (in detail, during the period when the transistor ML is controlled to be off).

The non-inverting input terminal of the correction comparator 36 is connected to the node 37*c*, and the inverting input terminal of the correction comparator 36 is connected to the source of the transistor ML (therefore, is connected to the ground). The correction comparator 36 compares a voltage at its inverting input terminal with a voltage at its non-inverting input terminal, and outputs a signal Sa according to a comparison result thereof (i.e., a signal Sa indicating a magnitude relationship between two voltages to be compared) from its output terminal. The signal Sa is a binary signal which takes a high or low signal level, as in the signal ZXOUT. Specifically, the correction comparator 36 compares the voltage Vsh with the ground voltage, and outputs the high level signal Sa when the voltage Vsh is higher than the ground voltage, and outputs the low level signal Sa when the voltage Vsh is lower than the ground voltage. When the voltage Vsh is matched to the ground voltage, the correction comparator 36 outputs the high or low level signal Sa.

The signal Sa is fed to the adjustment circuit 38. The adjustment circuit 38 corrects the offset voltage Voffset in a rising direction or falling direction in accordance with the level of the signal Sa. It may be understood that the adjustment circuit 38 is not a component of the offset correction circuit 35 but may be included in a component of the reverse current detection circuit 31.

Figure 8:
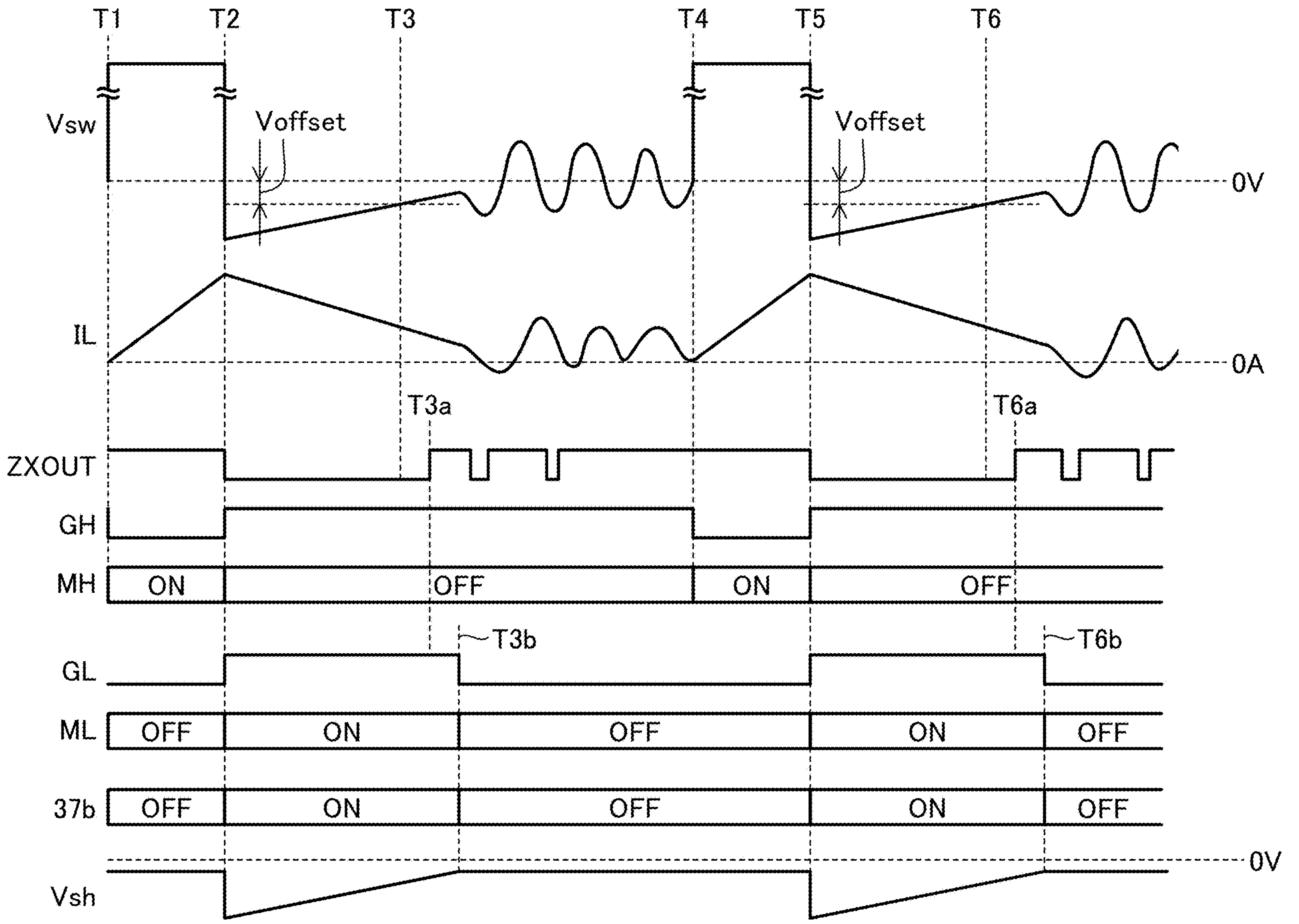
FIG. 8 is a timing chart for illustrating the operation of the light-load support circuit, which is in accordance with the first practical example belonging to the embodiment of the present disclosure.

With reference to FIG. 8, an operation of the switching power supply apparatus 1 will now be described, in a situation in which a rise edge occurs in the signal ZXOUT during the on period of the transistor ML. FIG. 8 is a timing chart in such a situation. FIG. 8 illustrates, from top to bottom, a waveform of the switch voltage Vsw, a waveform of the coil current IL, a waveform of the signal ZXOUT, a waveform of the gate signal GH, a state transition of the transistor MH, a waveform of the gate signal GL, and a state transition of the transistor ML, a state transition of the switch 37*b*, and a waveform of the voltage Vsh. As time passes, time points T1, T2, T3, T4, T5, and T6 occur in this order. A length between the time points T1 and T4 matches a length of the switching period (i.e., matches a reciprocal of the frequency fpwm).

In an example illustrated in FIG. 8, the offset voltage Voffset at the time point T1 is higher than an optimum voltage. When the offset voltage Voffset is higher than the optimum voltage, the state of the output stage MM is switched from the low-output state to the Hi-Z state at a timing when the positive coil current IL flows in the light-load state. When the offset voltage Voffset matches the optimum voltage, the state of the output stage MM is switched from the low-output state to the Hi-Z state at a timing when the polarity of the coil current IL is just switched from positive to negative in the light-load state. When the offset voltage Voffset is lower than the optimum voltage, after the polarity of the coil current IL is switched from positive to negative in the light-load state, the state of the output stage MM is switched from the low-output state to the Hi-Z state at a timing when the negative coil current IL flows.

At the time point T1, the state of the output stage MM is switched to the high-output state in response to the rise edge of the signal SET (the signal SET is not illustrated in FIG. 8), and then, at the time point T2, the state of the output stage MM is switched from the high-output state to the low-output state in response to the rise edge of the signal RST (the signal RST is not illustrated in FIG. 8). The coil current IL monotonically increases between the time points T1 and T2, and, at the time point T2, the coil current IL has the positive value. At the time point T2, the state of the output stage MM is switched to the low-output state, and thereby the coil current IL monotonically decreases. After the time point T2, while "Vsw<0" holds, as the monotone decreasing of the coil current IL, the absolute value of the switch voltage Vsw also decreases.

After the time point T2, the absolute value of the switch voltage Vsw is larger than the offset voltage Voffset until immediately before the time point T3. At the time point T3, it is switched from the state where the absolute value of the switch voltage Vsw is larger than the offset voltage Voffset to the state where the absolute value of the switch voltage Vsw is smaller than the offset voltage Voffset. Namely, at the time point T3, it is switched from the state where the voltage (Vsw+Voffset) is lower than the ground voltage to the state where the voltage (Vsw+Voffset) is higher than the ground voltage, and in response to this switch, the rise edge occurs in the signal ZXOUT. In detail, the rise edge occurs in the signal ZXOUT at a time point T3*a*, which is after the time point T3. The time point T3*a* is a time point that elapses from the time point T3 by a delay time depending on response characteristics of the reverse current detection comparator 32.

At the stage when the rise edge occurs in the signal ZXOUT at the time point T3*a*, the gate signal GL is the high level and the transistor ML is on. The switching control circuit 20 generates the fall edge in the gate signal GL in response to the rise edge of the signal ZXOUT at the time point T3*a*, thereby switching off the transistor ML. In detail, the fall edge occurs in the gate signal GL at a time point T3*b*, which is later than a time point T3*a*, and thereby the transistor ML is switched from on to off. That is, the switching control circuit 20 switches the state of the output stage MM from the low-output state to the Hi-Z state at the time point T3*b*, in response to the rise edge of the signal ZXOUT. A time difference between the time points T3*a* and T3*b* is a transmission delay depending on the response characteristics of the switching control circuit 20.

After the state of the output stage MM is switched to the Hi-Z state at the time point T3*b*, a free oscillation occurs in the waveforms of the switch voltage Vsw and the coil current IL. Then, the time point T4 is reached. The operation of one period starting from the time point T1 is similar to the operation of one period starting from the time point T4.

Namely, at the time point T4, the state of the output stage MM is switched to the high-output state in response to the rise edge of the signal SET (the signal SET is not illustrated in FIG. 8), and then, at the time point T5, the state of the output stage MM is switched from the high-output state to the low-output state in response to the rise edge of the signal RST (the signal RST is not illustrated in FIG. 8). The coil current IL monotonically increases between the time points T4 and T5, and, at the time point T5, the coil current IL has the positive value. At the time point T5, the state of the output stage MM is switched to the low-output state, and thereby the coil current IL monotonically decreases. After the time point T5, while "Vsw<0" holds, as the monotone decreasing of the coil current IL, the absolute value of the switch voltage Vsw also decreases.

After the time point T5, the absolute value of the switch voltage Vsw is larger than the offset voltage Voffset until immediately before the time point T6. At the time point T6, it is switched from the state where the absolute value of the switch voltage Vsw is larger than the offset voltage Voffset to the state where the absolute value of the switch voltage Vsw is smaller than the offset voltage Voffset. Namely, at the time point T6, it is switched from the state where the voltage (Vsw+Voffset) is lower than the ground voltage to the state where the voltage (Vsw+Voffset) is higher than the ground voltage, and in response to this switch, the rise edge occurs in the signal ZXOUT. In detail, the rise edge occurs in the signal ZXOUT at the time point T6*a*, which is after the time point T6. The time point Toa is a time point that elapses from the time point T6 by a delay time depending on response characteristics of the reverse current detection comparator 32.

At the stage when the rise edge occurs in the signal ZXOUT at the time point Toa, the gate signal GL is the high level and the transistor ML is on. The switching control circuit 20 generates the fall edge in the gate signal GL in response to the rise edge of the signal ZXOUT at the time point Toa, thereby switching off the transistor ML. In detail, the fall edge occurs in the gate signal GL at a time point T6*b*, which is later than a time point Toa, and thereby the transistor ML is switched from on to off. That is, the switching control circuit 20 switches the state of the output stage MM from the low-output state to the Hi-Z state at the time point T6*b*, in response to the rise edge of the signal ZXOUT. A time difference between the time points T6*a* and T6*b* is a transmission delay depending on the response characteristics of the switching control circuit 20. Thereafter, a similar operation is also repeated.

Although not obvious from FIG. 8, it should be noted here that the offset voltage Voffset is corrected toward the optimum voltage on the basis of the signal Sa according to the voltage Vsh. This point will now be described. The switch 37*b* is turned on/off in a similar manner to the transistor ML. Therefore, the sample-and-hold circuit 37 samples the switch voltage Vsw during the on period of the switch 37*b* and holds the switch voltage Vsw at a specific timing during the off period of the switch 37*b*. The specific timing is a timing when the output stage MM is switched from the low-output state to the Hi-Z state, and is also a timing when the switch 37*b* is switched from on to off. In an example illustrated in FIG. 8, the time points T3*a* and T6*b* each correspond to the specific timing. The switch voltage Vsw at the specific timing is held in the capacitor 37*a* as the voltage Vsh during the off period of the switch 37*b*.

When the rise edge occurs in the signal ZXOUT during the on period of the transistor ML, the adjustment circuit 38 corrects the offset voltage Voffset on the basis of the switch voltage Vsw at the specific timing. In order to determine whether the rise edge occurs in the signal ZXOUT during the on period of the transistor ML, the signal ZXOUT and the gate signal GL may be supplied to the adjustment circuit 38.

As a voltage corresponding to the switch voltage Vsw at the specific timing, the voltage Vsh held in the capacitor 37*a* during the off period of the switch 37*b* is referred to as a comparative held voltage Vsh, among others. Then, when the rise edge occurs in the signal ZXOUT during the on period of the transistor ML, the comparative held voltage Vsh and the ground voltage are compared with each other by the correction comparator 36, and the offset voltage Voffset is corrected by the adjustment circuit 38 on the basis of the signal Sa indicating a result of their comparison.

When the coil current IL is sufficiently large, the absolute value of the switch voltage Vsw during the on period of a transistor ML is sufficiently larger than the offset voltage Voffset, therefore no rise edge occurs in the signal ZXOUT during the on period of the transistor ML.

In the switching period starting from the time point T1, the rise edge occurs in the signal ZXOUT at the time point T3*a* during the on period of the transistor ML, and the specific timing is the time point T3*b*. Therefore, in the switching period starting from the time point T1, the voltage Vsh at the time point T3*b* corresponds to the comparative held voltage Vsh, and the voltage Vsh until the switch 37*b* is switched to on after the time point T3*b* (i.e., the voltage Vsh until immediately before the time point T5 after the time point T3*b*) also corresponds to the comparative held voltage Vsh. A value of the voltage Vsh at the time point T3*b* is held constant until the switch 37*b* is then switched to on (however, an error due to a leakage current is ignore here).

In the example illustrated in FIG. 8, the voltage Vsh at the time point T3*b* (the comparative held voltage Vsh during the switching period starting from the time point T1) is lower than the ground voltage. When the voltage Vsh at the time point T3*b* is lower than the ground voltage, on the basis of the low level signal Sa indicating such a state, the adjustment circuit 38 corrects the offset voltage Voffset to be decreased by a predetermined unit correction amount ΔV. The correction (in this case, the decreasing correction) of the offset voltage Voffset is performed, after the time point T3*b* as the specific timing, before the transistor ML is switched from off to on next time (e.g., may be performed at the timing when the transistor MH is switched from off to on next time). Therefore, the offset voltage Voffset during the on period of the transistor ML is lower in the switching period starting from the time point T4 than in the switching period starting from the time point T1.

In the switching period starting from the time point T4, the rise edge occurs in the signal ZXOUT at the time point Toa during the on period of the transistor ML, and the specific timing is the time point T6*b*. Therefore, in the switching period starting from the time point T4, the voltage Vsh at the time point T6*b* corresponds to the comparative held voltage Vsh, and the voltage Vsh until the switch 37*b* is switched to on after the time point T6*b* also corresponds to the comparative held voltage Vsh. A value of the voltage Vsh at the time point T6*b* is held constant until the switch 37*b* is then switched to on (however, an error due to a leakage current is ignore here).

In the example illustrated in FIG. 8, the voltage Vsh at the time point T6*b* (the comparative held voltage Vsh during the switching period starting from the time point T1) is lower than the ground voltage. When the voltage Vsh at the time point T6*b* is lower than the ground voltage, on the basis of the low level signal Sa indicating such a state, the adjustment circuit 38 corrects the offset voltage Voffset to be decreased by a predetermined unit correction amount ΔV. The correction (in this case, the decreasing correction) of the offset voltage Voffset is performed, after the time point T6*b* as the specific timing, before the transistor ML is switched from off to on next time (e.g., may be performed at the timing when the transistor MH is switched from off to on next time). Therefore, the offset voltage Voffset during the on period of the transistor ML is lower in the next switching period than in the switching period starting from the time point T4.

Figure 9:
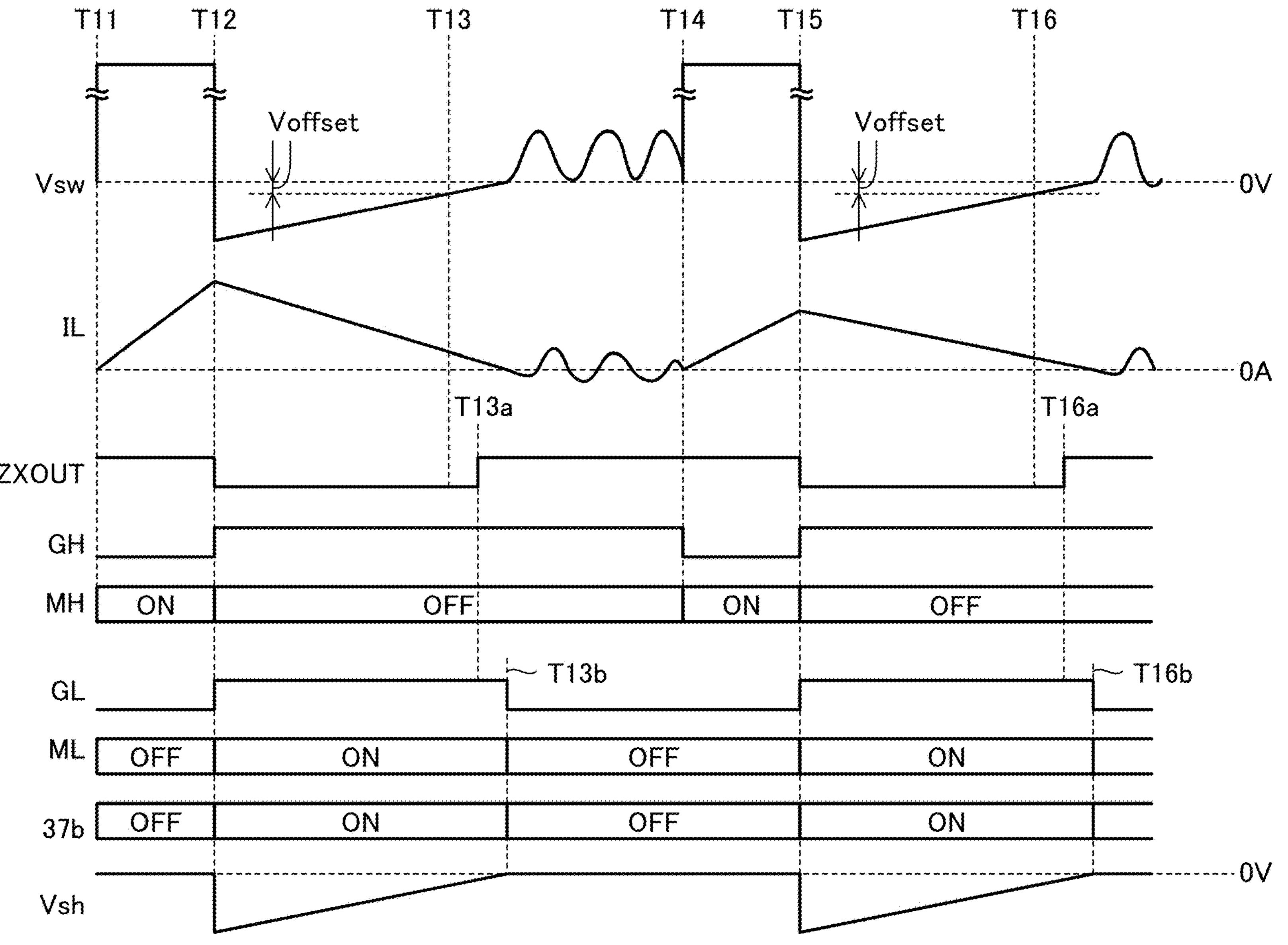
FIG. 9 is a timing chart for illustrating the operation of the light-load support circuit, which is in accordance with the first practical example belonging to the embodiment of the present disclosure.

Therefore, the offset voltage Voffset is decreased by the predetermined unit correction amount ΔV at every switching period by repeating an operation similar to the operation between the time points T1 and T4. FIG. 9 illustrates a timing chart after the offset voltage Voffset is corrected to the optimum voltage as a result of the offset voltage Voffset is decreased by the unit correction amount ΔV as the operation similar to the operation between the time points T1 and T4 is repeated. FIG. 9 is a timing chart in a situation in which the rise edge occurs in the signal ZXOUT during the on period of the transistor ML similar to FIG. 8 (however, the offset voltage Voffset has the optimum voltage). In a similar manner to FIG. 8, FIG. 9 illustrates, from top to bottom, a waveform of the switch voltage Vsw, a waveform of the coil current IL, a waveform of the signal ZXOUT, a waveform of the gate signal GH, a state transition of the transistor MH, a waveform of the gate signal GL, and a state transition of the transistor ML, a state transition of the switch 37*b*, and a waveform of the voltage Vsh.

In the situation illustrated in FIG. 8, the offset voltage Voffset is higher than the optimum voltage, and therefore the state of the output stage MM is switched from the low-output state to the Hi-Z state at the timing when the positive coil current IL flows (e.g., the time point T3*b* or T6*b*). In this case, the positive coil current IL flows through a parasitic diode of the transistor ML between for a while after the state of the output stage MM is switched to the Hi-Z state, which increases a loss accordingly.

In contrast, in the situation illustrated in FIG. 9, the offset voltage Voffset matches or is sufficiently close to the optimum voltage, and therefore the state of the output stage MM is switched from the low-output state to the Hi-Z state at or near the timing when the polarity of the coil current IL is just switched from positive to negative. Similar to the timing chart in FIG. 8, but an operation according to the timing chart illustrated in FIG. 9 will now be described. As time passes, time points T11, T12, T13, T14, T15, and T16 occur in this order. The time point T11 is a time point later than the time point T6 in FIG. 8. A length between the time points T11 and T14 matches a length of the switching period (i.e., matches the reciprocal of the frequency fpwm).

At the time point T11, the state of the output stage MM is switched to the high-output state in response to the rise edge of the signal SET (the signal SET is not illustrated in FIG. 9), and then, at the time point T12, the state of the output stage MM is switched from the high-output state to the low-output state in response to the rise edge of the signal RST (the signal RST is not illustrated in FIG. 9). The coil current IL monotonically increases between the time points T11 and T12, and, at the time point T12, the coil current IL has the positive value. At the time point T12, the state of the output stage MM is switched to the low-output state, and thereby the coil current IL monotonically decreases. After the time point T12, while "Vsw<0" holds, as the monotone decreasing of the coil current IL, the absolute value of the switch voltage Vsw also decreases.

After the time point T12, the absolute value of the switch voltage Vsw is larger than the offset voltage Voffset until immediately before the time point T13. At the time point T13, it is switched from the state where the absolute value of the switch voltage Vsw is larger than the offset voltage Voffset to the state where the absolute value of the switch voltage Vsw is smaller than the offset voltage Voffset. Namely, at the time point T13, it is switched from the state where the voltage (Vsw+Voffset) is lower than the ground voltage to the state where the voltage (Vsw+Voffset) is higher than the ground voltage, and in response to this switch, the rise edge occurs in the signal ZXOUT. In detail, the rise edge occurs in the signal ZXOUT at a time point T13*a*, which is after the time point T13. The time point T13*a* is a time point that elapses from the time point T13 by a delay time depending on response characteristics of the reverse current detection comparator 32.

At the stage when the rise edge occurs in the signal ZXOUT at the time point T13*a*, the gate signal GL is the high level and the transistor ML is on. The switching control circuit 20 generates the fall edge in the gate signal GL in response to the rise edge of the signal ZXOUT at the time point T13*a*, thereby switching off the transistor ML. In detail, the fall edge occurs in the gate signal GL at a time point T13*b*, which is later than a time point T13*a*, and thereby the transistor ML is switched from on to off. That is, the switching control circuit 20 switches the state of the output stage MM from the low-output state to the Hi-Z state at the time point T13*b*, in response to the rise edge of the signal ZXOUT. A time difference between the time points T13*a* and T13*b* is a transmission delay depending on the response characteristics of the switching control circuit 20.

After the state of the output stage MM is switched to the Hi-Z state at the time point T13*b*, a free oscillation occurs in the waveforms of the switch voltage Vsw and the coil current IL. Then, the time point T14 is reached. The operation of one period starting from the time point T11 is similar to the operation of one period starting from the time point T14.

Namely, at the time point T14, the state of the output stage MM is switched to the high-output state in response to the rise edge of the signal SET (the signal SET is not illustrated in FIG. 9), and then, at the time point T15, the state of the output stage MM is switched from the high-output state to the low-output state in response to the rise edge of the signal RST (the signal RST is not illustrated in FIG. 9). The coil current IL monotonically increases between the time points T14 and T15, and, at the time point T15, the coil current IL has the positive value. At the time point T15, the state of the output stage MM is switched to the low-output state, and thereby the coil current IL monotonically decreases. After the time point T15, while "Vsw<0" holds, as the monotone decreasing of the coil current IL, the absolute value of the switch voltage Vsw also decreases.

After the time point T15, the absolute value of the switch voltage Vsw is larger than the offset voltage Voffset until immediately before the time point T16. At the time point T16, it is switched from the state where the absolute value of the switch voltage Vsw is larger than the offset voltage Voffset to the state where the absolute value of the switch voltage Vsw is smaller than the offset voltage Voffset. Namely, at the time point T16, it is switched from the state where the voltage (Vsw+Voffset) is lower than the ground voltage to the state where the voltage (Vsw+Voffset) is higher than the ground voltage, and in response to this switch, the rise edge occurs in the signal ZXOUT. In detail, the rise edge occurs in the signal ZXOUT at a time point T16*a*, which is after the time point T16. The time point T16*a* is a time point that elapses from the time point T16 by a delay time depending on response characteristics of the reverse current detection comparator 32.

At the stage when the rise edge occurs in the signal ZXOUT at the time point T16*a*, the gate signal GL is the high level and the transistor ML is on. The switching control circuit 20 generates the fall edge in the gate signal GL in response to the rise edge of the signal ZXOUT at the time point T16*a*, thereby switching off the transistor ML. In detail, the fall edge occurs in the gate signal GL at a time point T16*b*, which is later than a time point T16*a*, and thereby the transistor ML is switched from on to off. That is, the switching control circuit 20 switches the state of the output stage MM from the low-output state to the Hi-Z state at the time point T16*b*, in response to the rise edge of the signal ZXOUT. A time difference between the time points T16*a* and T16*b* is a transmission delay depending on the response characteristics of the switching control circuit 20. Thereafter, a similar operation is also repeated.

As described above, the sample-and-hold circuit 37 samples the switch voltage Vsw during the on period of the switch 37*b* and holds the switch voltage Vsw at a specific timing during the off period of the switch 37*b* as the voltage Vsh (the comparative held voltage Vsh). In an example illustrated in FIG. 9, the time points T13*a* and T16*b* each correspond to the specific timing. The switch voltage Vsw at the specific timing is held in the capacitor 37*a* as the voltage Vsh (the comparative held voltage Vsh) during the off period of the switch 37*b*.

In the switching period starting from the time point T11, the rise edge occurs in the signal ZXOUT at the time point T13*a* during the on period of the transistor ML, and the specific timing is the time point T13*b*. Therefore, in the switching period starting from the time point T11, the voltage Vsh at the time point T13*b* corresponds to the comparative held voltage Vsh, and the voltage Vsh until the switch 37*b* is switched to on after the time point T13*b* (i.e., the voltage Vsh until immediately before the time point T15 after the time point T13*b*) also corresponds to the comparative held voltage Vsh. A value of the voltage Vsh at the time point T13*b* is held constant until the switch 37*b* is then switched to on (however, an error due to a leakage current is ignore here).

In the example illustrated in FIG. 9, the voltage Vsh at the time point T13*b* (the comparative held voltage Vsh during the switching period starting from the time point T11) substantially matches the ground voltage. If the voltage Vsh at the time point T13*b* is lower than the ground voltage, on the basis of the low level signal Sa indicating such a state, the adjustment circuit 38 corrects the offset voltage Voffset to be decreased by a predetermined unit correction amount ΔV. Conversely, if the voltage Vsh at the time point T13*b* is higher than the ground voltage, on the basis of the high level signal Sa indicating such a state, the adjustment circuit 38 corrects the offset voltage Voffset to be increased by a predetermined unit correction amount ΔV. The correction of the offset voltage Voffset is performed, after the time point T13*b* as the specific timing, before the transistor ML is switched from off to on next time (e.g., may be performed at the timing when the transistor MH is switched from off to on next time). Therefore, the offset voltage Voffset during the on period of the transistor ML differs by the unit correction amount ΔV between the switching period starting from the time point T11 and the switching period starting from the time point T14.

In the switching period starting from the time point T14, the rise edge occurs in the signal ZXOUT at the time point T16*a* during the on period of the transistor ML, and the specific timing is the time point T16*b*. Therefore, in the switching period starting from the time point T14, the voltage Vsh at the time point T16*b* corresponds to the comparative held voltage Vsh, and the voltage Vsh until the switch 37*b* is switched to on after the time point T16*b* also corresponds to the comparative held voltage Vsh. A value of the voltage Vsh at the time point T16*b* is held constant until the switch 37*b* is then switched to on (however, an error due to a leakage current is ignore here).

In the example illustrated in FIG. 9, the voltage Vsh at the time point T16*b* (the comparative held voltage Vsh during the switching period starting from the time point T14) substantially matches the ground voltage. If the voltage Vsh at the time point T16*b* is lower than the ground voltage, on the basis of the low level signal Sa indicating such a state, the adjustment circuit 38 corrects the offset voltage Voffset to be decreased by a predetermined unit correction amount ΔV. Conversely, if the voltage Vsh at the time point T16*b* is higher than the ground voltage, on the basis of the high level signal Sa indicating such a state, the adjustment circuit 38 corrects the offset voltage Voffset to be increased by a predetermined unit correction amount ΔV. The correction of the offset voltage Voffset is performed, after the time point T16*b* as the specific timing, before the transistor ML is switched from off to on next time (e.g., may be performed at the timing when the transistor MH is switched from off to on next time). Therefore, the offset voltage Voffset during the on period of the transistor ML differs by the unit correction amount ΔV between the switching period starting from the time point T14 and the next switching period.

After the voltage Vsh at the specific timing reaches near the ground voltage, it is expected that the offset voltage Voffset will be corrected to decrease and increase alternately, so that the offset voltage Voffset will be kept near the optimum voltage.

Although different from the example in FIG. 8, if the voltage Vsh at the time point T3*b* is higher than the ground voltage, on the basis of the high level signal Sa indicating such a state, the adjustment circuit 38 increases the offset voltage Voffset by a predetermined unit correction amount ΔV. Similarly, although different from the example in FIG. 8, if the voltage Vsh at the time point T6*b* is higher than the ground voltage, on the basis of the high level signal Sa indicating such a state, the adjustment circuit 38 increases the offset voltage Voffset by a predetermined unit correction amount ΔV. After the repetition of the increasing correction of the offset voltage Voffset, and after the voltage Vsh at the specific timing reaches near the ground voltage, the operation is performed according to the timing chart illustrated in FIG. 9.

Figure 10:
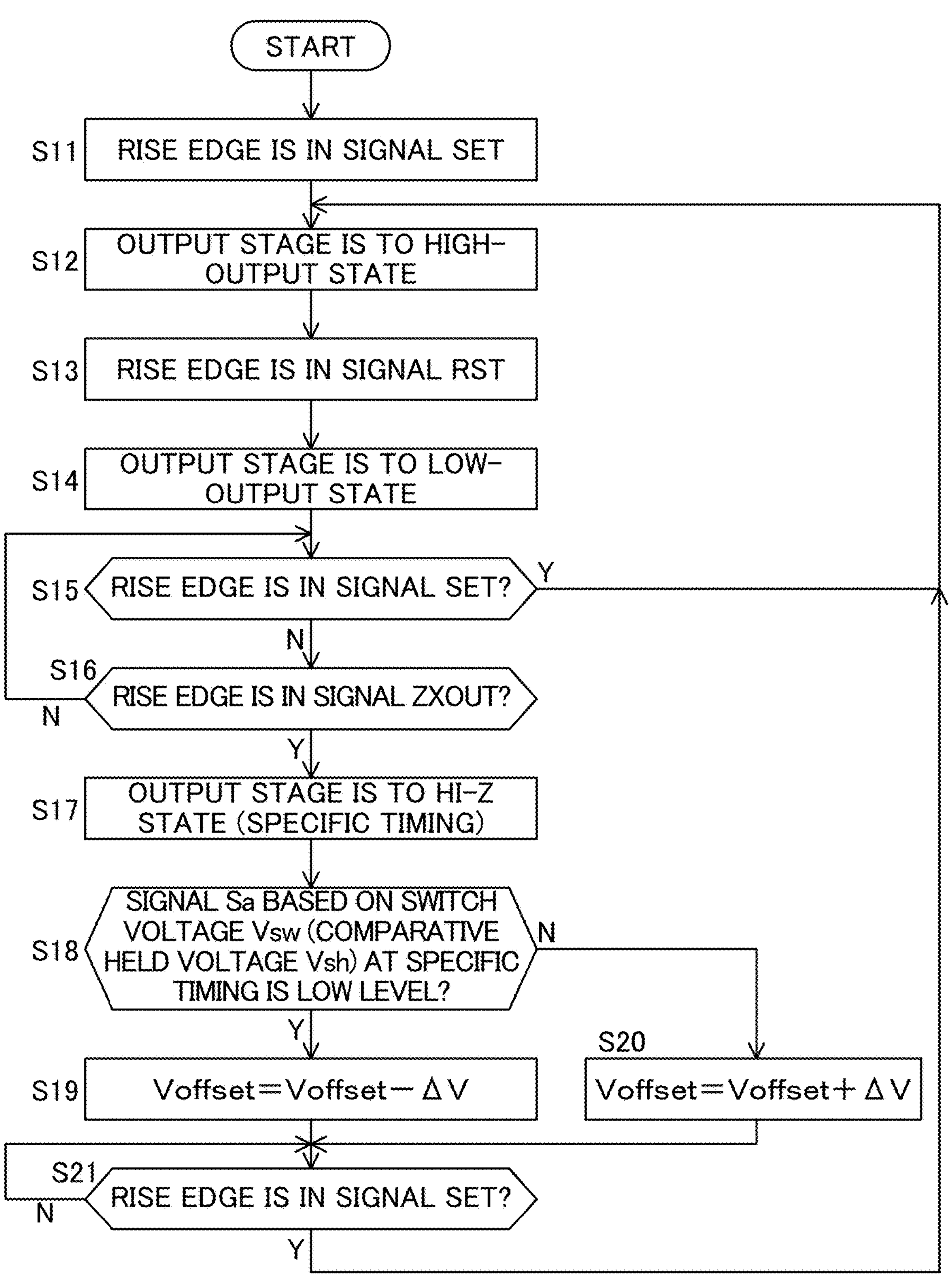
FIG. 10 is an operation flow chart of the power supply control device, focusing on a correction of an offset voltage, which is in accordance with the first practical example belonging to the embodiment of the present disclosure.

FIG. 10 is an operation flow chart of the power supply control device 10, focusing on the correction of the offset voltage Voffset. An operation flow of the power supply control device 10 will now be described in accordance with the operation flow chart in FIG. 10. After the power supply control device 10 is started up and undergoes a predetermined initial sequence operation, the process proceeds to Step S11. In Step S11, the rise edge occurs in the signal SET. In the subsequent Step S12, the state of the output stage MM is set as the high-output state in response to the rise edge of the signal SET. Subsequently, the rise edge occurs in the signal RST at Step S13. In the subsequent Step S14, the state of the output stage MM is set as the low-output state in response to the rise edge of the signal RST. Subsequently, the process proceeds to Step S15.

In Step S15, the switching control circuit 20 verifies whether the rise edge occurs in the signal SET. When the rise edge occurs in the signal SET (Y in Step S15), the process returns to Step S12. When no rise edge occurs in the signal SET (N in Step S15), the process proceeds to Step S16.

In Step S16, the switching control circuit 20 verifies whether the rise edge occurs in the signal ZXOUT. When the rise edge occurs in the signal ZXOUT (Y in Step S16), the process proceeds to Step S17. When no rise edge occurs in the signal ZXOUT (N in Step S16), the process returns to Step S15.

In Step S17, the switching control circuit 20 switches the state of the output stage MM from the low-output state to the Hi-Z state. As described above, the timing when the state of the output stage MM is switched from the low-output state to the Hi-Z state corresponds to the specific timing, and as a voltage corresponding to the switch voltage Vsw at the specific timing, the voltage Vsh held in the capacitor 37*a* is referred to as the comparative held voltage Vsh. After Step S17, the process proceeds to Step S18.

In Step S18, the adjustment circuit 38 refers to the level of the signal Sa indicating the magnitude relationship between switch voltage Vsw (i.e., the comparative held voltage Vsh) at the specific timing and the ground voltage, and determines whether the referred level is the low level. If the referred level is the low level (Y in Step S18), the process proceeds to Step S19. If the referred level is the high level (N in Step S18), the process proceeds to Step S20.

In Step S19, the adjustment circuit 38 corrects the offset voltage Voffset so as to be decreased by the predetermined unit correction amount ΔV. After Step S19, the process proceeds to Step S21. In Step S20, the adjustment circuit 38 corrects the offset voltage Voffset so as to be increased by the predetermined unit correction amount ΔV. Even after Step S20, the process proceeds to Step S21. In Step S21, the switching control circuit 20 waits until the rise edge occurs in the signal SET, and returns to Step S12 at the time when the rise edge occurs in the signal SET.

In accordance with the light-load support circuit 30 according to the first practical example, the offset voltage Voffset can be adjusted to the optimum voltage, without being affected by the output voltage Vout, the inductance of the coil L1, the input voltage Vin, the ambient temperature, and the like. As a result, it is possible to minimize a decrease in efficiency in the light-load state.

Characteristics of comparators will now be described. If a comparator capable of sufficiently high speed operation and having a sufficiently high accuracy can be used as the reverse current detection comparator, it is easy to suppress the errors as described with reference to FIGS. 5 and 6. However, it is difficult to design a comparator that can achieve both high-speed operation and high accuracy, and a circuit size thereof tends to increase. Therefore, in the light-load support circuit 30 illustrated in FIG. 7, high-speed and high-accuracy operations are shared by the reverse current detection comparator 32 and the correction comparator 36.

Specifically, during the off period of the transistor ML, it should be detected at high speed whether the magnitude of the switch voltage Vsw is below the offset voltage Voffset, and therefore the reverse current detection comparator 32 is designed for the high-speed operation. Although it is difficult to achieve high accuracy in the reverse current detection comparator 32, which is designed for high-speed operation, light-load support circuit 30 does not require high accuracy in the reverse current detection comparator 32. As a result, a large detection error may occur when the reverse current detection comparator 32 stand alone, the detection error can be eliminated by using the highly accurate correction comparator 36. After the switch voltage Vsw at the specific timing is held, the correction comparator 36 does not need to reflect a comparison result between the holding voltage and the ground voltage on the signal Sa at high speed, and therefore there is no problem even if the operating speed of the correction comparator 36 is low.

Contrasting the comparators 32 and 36, the following matters can be perceived. First, a propagation delay time of the reverse current detection comparator 32 is shorter than a propagation delay time of the correction comparator 36. In any comparator, the propagation delay time is time required from inverting the magnitude relationship between a voltage at the non-inverting input terminal and a voltage at the inverting input terminal until the level of an output signal from the comparator inverts between high and low levels. The propagation delay time of the comparator depends on conditions under which the comparator is driven. Accordingly, in detail, when the comparators 32 and 36 are driven under common operating conditions, the propagation delay time of the reverse current detection comparator 32 is shorter than the propagation delay time of the correction comparator 36. The operating conditions related to the propagation delay time include conditions of supply voltage to the comparator, conditions of input voltage to inverting and non-inverting input terminals, ambient temperature conditions, and the like, of the comparator.

The correction comparator 36 has high accuracy than the reverse current detection comparator 32. The accuracy in the comparator is expressed in terms of the input offset voltage. In any comparator, a potential difference between the non-inverting input terminal and the inverting input terminal when the level of the output signal from the aforementioned comparator is inverted between the high level and the low level is ideally zero, but may be other than zero. The potential difference is the input offset voltage. A comparator having relatively high accuracy is more likely to have a reduced input offset voltage than a comparator having relatively low accuracy. However, since the input offset voltage varies due to individual differences, even a comparator having relatively low accuracy may have a sufficiently low input offset voltage. However, the input offset voltage varies around zero, and a range of variation in the input offset voltage is smaller in a comparator having relatively high accuracy than in a comparator having relatively low accuracy. In fact, the range of variation in the input offset voltage in the correction comparator 36 is smaller than the range of variation in the input offset voltage in the reverse current detection comparator 32. Accordingly, the maximum value of the input offset voltage in the correction comparator 36 is smaller than the maximum value of the input offset voltage in the reverse current detection comparator 32. In detail, the comparators 32 and 36 are designed and formed so that when the comparators 32 and 36 are driven under common operating conditions, the maximum value of the input offset voltage in the correction comparator 36 may be smaller than the maximum value of the input offset voltage of in the reverse current detection comparator 32. The operating conditions related to the input offset voltage include conditions of supply voltage to the comparator, ambient temperature conditions, and the like, of the comparator.

Second Practical Example

A second practical example will now be described. An insertion position of the offset voltage output circuit 33 in the reverse current detection circuit 31 according to the first practical example may be changed to a position between the inverting input terminal of the reverse current detection comparator 32 and the source of the transistor ML. Namely, the reverse current detection circuit 31 illustrated in FIG. 7 may be modified to a reverse current detection circuit 31 illustrated in FIG. 11.

The reverse current detection circuit 31 illustrated in FIG. 7 differs from the reverse current detection circuit 31 illustrated in FIG. 11, as follows. In the reverse current detection circuit 31 illustrated in FIG. 11, the negative-side terminal of the offset voltage output circuit 33 is connected to the inverting input terminal of the reverse current detection comparator 32, and the positive-side terminal of the offset voltage output circuit 33 is connected to the source of the transistor ML (therefore is connected to the ground). In the reverse current detection circuit 31 illustrated in FIG. 11, the non-inverting input terminal of the reverse current detection comparator 32 is connected to the switch terminal SW. Therefore, in the reverse current detection circuit 31 illustrated in FIG. 11, the switch voltage Vsw is applied to the non-inverting input terminal of the reverse current detection comparator 32, and a voltage lower than the ground voltage by the offset voltage Voffset is applied to the inverting input terminal of the reverse current detection comparator 32. In other respects, the reverse current detection circuit 31 illustrated in FIG. 11 is similar to the reverse current detection circuit 31 illustrated in FIG. 7.

Figure 11:
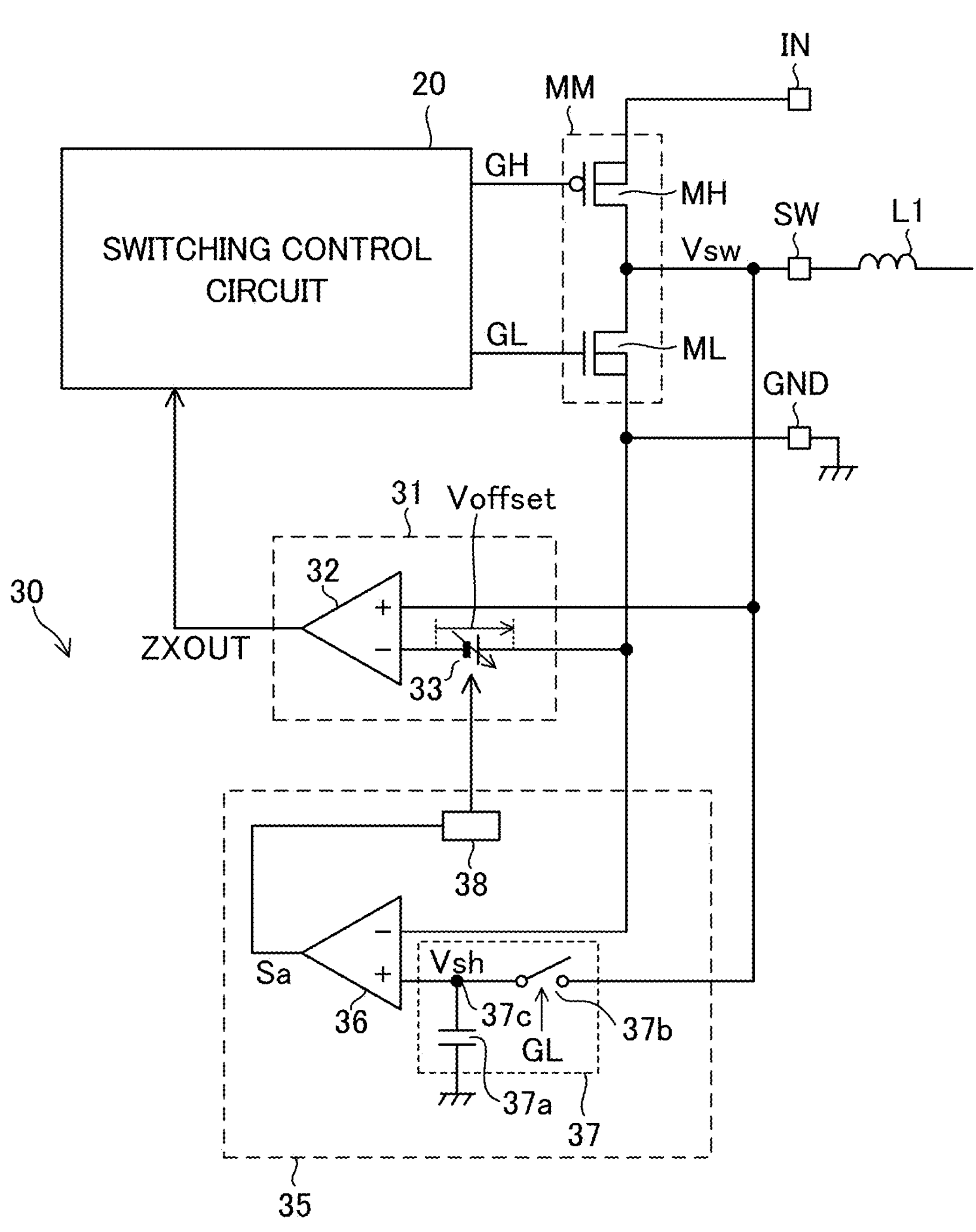
FIG. 11 is a diagram illustrating a light-load support circuit and a peripheral circuit thereof, which is in accordance with a second practical example belonging to the embodiment of the present disclosure.

An operation similar to the reverse current detection circuit 31 illustrated in FIG. 7 is realized also by the reverse current detection circuit 31 illustrated in FIG. 11. Namely, the reverse current detection comparator 32 illustrated in FIG. 11 has a function of detecting whether a magnitude of the switch voltage Vsw is lower than the offset voltage Voffset during the on period of the transistor ML, and outputs the high level signal ZXOUT when the magnitude of the switch voltage Vsw is lower than the offset voltage Voffset.

Third Practical Example

Figure 12:
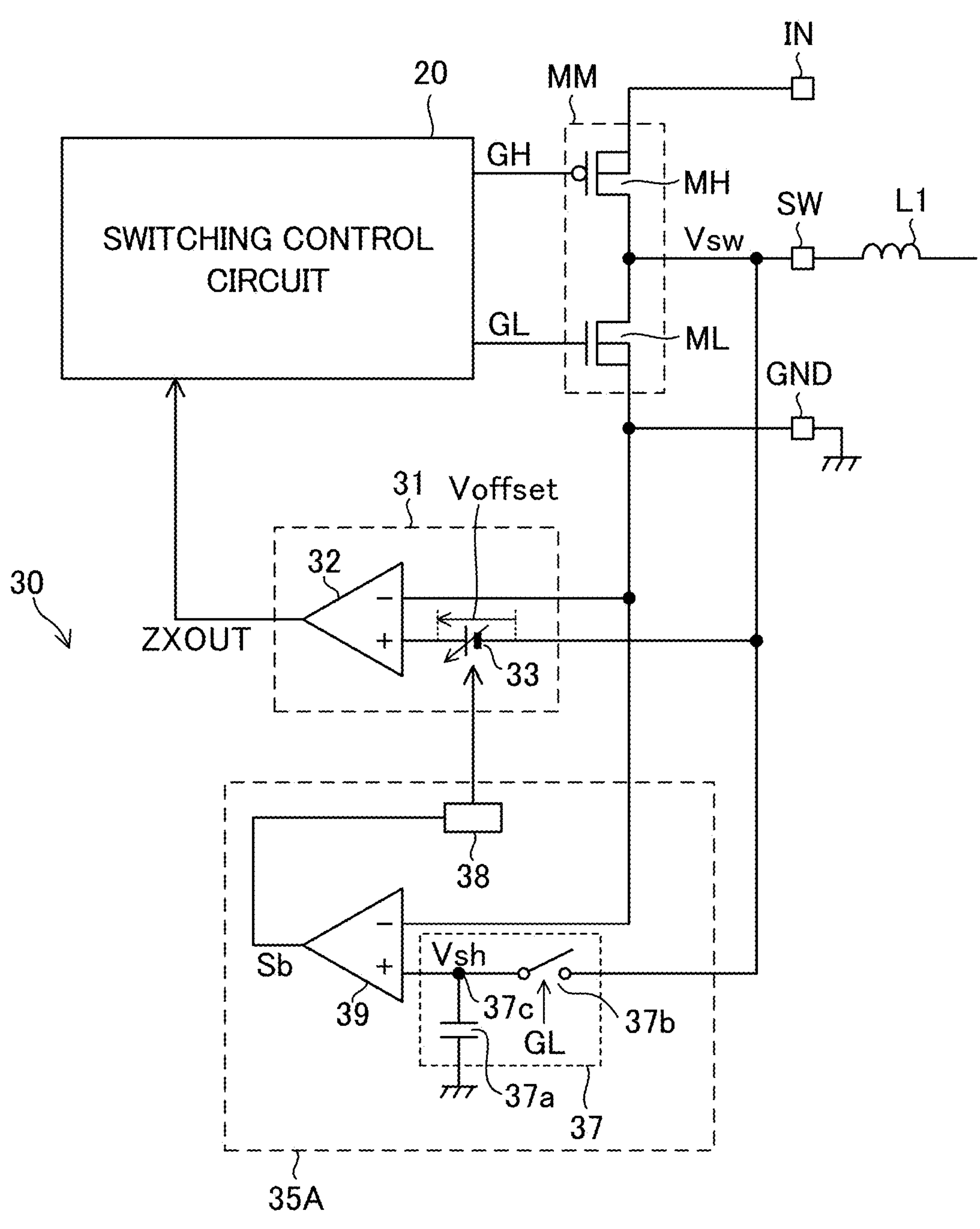
FIG. 12 is a diagram illustrating a light-load support circuit and a peripheral circuit thereof, which is in accordance with a third practical example belonging to the embodiment of the present disclosure.

A third practical example will now be described. The correction comparator 36 in the offset correction circuit 35 according to the first practical example may be modified to be replaced with an amplifier. FIG. 12 illustrates an offset correction circuit 35A, which is an offset correction circuit 35 subjected to such a modification. The offset correction circuit 35A is obtained by replacing the correction comparator 36 in the offset correction circuit 35 illustrated in FIG. 7 with a correction amplifier 39.

An inverting input terminal of the correction amplifier 39 is connected to the source of the transistor ML and receives the ground voltage. A non-inverting input terminal of the correction amplifier 39 is connected to the node 37*c* and receives the voltage Vsh. The correction amplifier 39 outputs a signal Sb according to a difference between the voltage Vsh and the ground voltage. The signal Sb is a signal proportional to the difference between the voltage Vsh and the ground voltage (in detail, a signal having a signal value proportional to the aforementioned difference). When "Vsh<0" holds, the signal Sb has a negative signal value, and the larger the absolute value of the voltage Vsh, the larger an absolute value of the signal Sb. When "Vsh>0" holds, the signal Sb has a positive signal value, and the larger the absolute value of the voltage Vsh, the larger an absolute value of the signal Sb.

In the offset correction circuit 35A, the signal Sb is fed to the adjustment circuit 38, and the adjustment circuit 38 can correct the offset voltage Voffset in a rising direction or a falling direction in accordance with the signal Sb.

The sample-and-hold circuit 37 samples the switch voltage Vsw during the on period of the switch 37*b* and holds the switch voltage Vsw at a specific timing during the off period of the switch 37*b* as the voltage Vsh (the comparative held voltage Vsh). During the off period of the switch 37*b*, the correction amplifier 39 outputs the signal Sb proportional to the difference between the comparative held voltage Vsh and the ground voltage, and the adjustment circuit 38 corrects the offset voltage Voffset on the basis of the signal Sb output from the correction amplifier 39.

A correction method performed by the adjustment circuit 38 will now be described. Hereafter, unless otherwise stated, the signal Sb refers to the output signal Sb from the correction amplifier 39 during the off period of the switch 37*b*.

The adjustment circuit 38 corrects the offset voltage Voffset to be decreased, when the signal Sb has the negative signal value.

In this case, it is preferable that the amount of decrease in the offset voltage Voffset is increased as the absolute value of the signal Sb increases.

The adjustment circuit 38 corrects the offset voltage Voffset to be increased, when the signal Sb has the positive signal value.

In this case, it is preferable that the amount of increase in the offset voltage Voffset is increased as the absolute value of the signal Sb increases.

A performing timing of the correction of the offset voltage Voffset by the adjustment circuit 38 is as described in the first practical example. An action similar to the first practical example is obtained also by the third practical example. Furthermore, in the third practical example, the correction amount is adjusted in accordance with the difference between the comparative held voltage Vsh and the ground voltage, it is expected that the offset voltage Voffset will approach the optimum voltage in a shorter time than the first practical example.

Fourth Practical Example

A fourth practical example will now be described. In the fourth practical example, there will be described modified techniques, supplemental remarks, or the like with respect to the above-described matters.

The switching power supply apparatus 1 can be incorporated in any appliance. For example, the switching power supply apparatus 1 can be incorporated in a vehicle such as an automobile. In this case, the voltage source VS illustrated in FIG. 1 and the like may be a battery incorporated in the vehicle, and the load LD may include an Electronic Control Unit (ECU) incorporated in the vehicle.

For any signal or voltage, the relationship between its high and low levels may be reversed so long as that can be done without departure from what has been described above.

The channel types of the field-effect transistors (FETs) described in the above-described embodiments are merely an example. The channel type of any FET may be changed between the p-channel and n-channel types so long as that can be done without departure from what has been described above.

So long as there is no inconvenience, any transistor described above may be any type of transistor. For example, any transistor described above as the MOSFET may be replaced with a junction FET, an insulated-gate bipolar transistor (IGBT), or a bipolar transistor. Any transistor has a first electrode, a second electrode, and a control electrode. In an FET, one of the first and second electrodes is the drain, the other is the source, and the control electrode is the gate. In an IGBT, one of the first and second electrodes is the collector, the other is the emitter, and the control electrode is the gate. In a bipolar transistor that does not belong to the IGBT, one of the first and second electrodes is the collector, the other is the emitter, and the control electrode is the base.

Embodiments of the present disclosure can be modified in many ways as necessary without departure from the scope of the technical concepts defined in the appended claims. The embodiments described above are merely examples of how the present disclosure can be implemented, and what is meant by any of the terms used to describe the present disclosure and its constituent elements is not limited to what is specifically mentioned in connection with the embodiments. The specific values mentioned in the above description are meant merely as examples, and they may be modified to different values.

ADDITIONAL REMARKS

The following is an additional remark of the present disclosure for which the specific configuration examples are illustrated in the embodiments.

In a first configuration, a power supply control device according to one aspect of the present disclosure is a power supply control device (10) provided in a switching power supply apparatus (1) configured to generate an output voltage (Vout) from an input voltage (Vin), the power supply control device configured to control an operation of the switching power supply apparatus, the power supply control device including: an output stage (MM) including a first transistor (MH) provided between an application end (IN) of the input voltage and a switch terminal (SW), and a second transistor (ML) provided between the switch terminal and a ground; a switching control circuit (20) configured to perform switching driving to alternately turn on and turn off the first transistor and the second transistor in accordance with the output voltage; and a light-load support circuit (30), wherein the output voltage is generated by rectifying and smoothing a switch voltage (Vsw) occurring at the switch terminal by a coil (L1) provided between the switch terminal and an application end (OUT) of the output voltage and a capacitor (C1) provided between the application end of the output voltage and the ground, wherein the light-load support circuit includes a reverse current detection circuit (31) configured to output a reverse current detection signal when a magnitude of the switch voltage is lower than an offset voltage (Voffset) during an on period of the second transistor, and an offset correction circuit (35), wherein the switching control circuit switches the second transistor from off to on through the switching driving, and then switches the second transistor off when the reverse current detection signal is received from the reverse current detection circuit, thereby setting the output stage as a specific state (Hi-Z) in which both the first transistor and the second transistor are off, wherein the offset correction circuit corrects the offset voltage on the basis of the switch voltage at a specific timing (e.g., T3*b*) when the output stage is switched from a state where the second transistor is on to the specific state.

Consequently, the offset voltage can be adjusted to the optimum voltage, without being affected by the output voltage, the inductance of the coil, the input voltage, the ambient temperature, and the like. As a result, it is possible to minimize a decrease in efficiency in the light-load state.

In the power supply control device according to the above-described first configuration, it may be configured, as second configuration, so that: the offset correction circuit decreases the offset voltage when the switch voltage at the specific timing is lower than a voltage of the ground, and increases the offset voltage when the switch voltage at the specific timing is higher than the voltage of the ground.

In the power supply control device according to the above-described second configuration, it may be configured, as third configuration, so that: the offset correction circuit includes a sample-and-hold circuit (37) connected to the switch terminal and configured to sample the switch voltage and hold the switch voltage at the specific timing, and a correction comparator (36) configured to output a signal indicating a magnitude relationship between the voltage held by the sample-and-hold circuit and the voltage of the ground, wherein the offset voltage is corrected on the basis of the output signal from the correction comparator.

In the power supply control device according to the above-described third configuration, it may be configured, as fourth configuration, so that: the offset correction circuit corrects the offset voltage to be decreased or increased by a predetermined unit correction amount (ΔV) on the basis of the output signal from the correction comparator at every switching period of the output stage in the switching driving.

In the power supply control device according to the above-described third or fourth configuration, it may be configured, as fifth configuration, so that: the reverse current detection circuit includes an offset voltage output circuit (33) configured to output the offset voltage, and a reverse current detection comparator (32) configured to detect whether the magnitude of the switch voltage is lower than the offset voltage during the on period of the second transistor on the basis of the switch voltage and the offset voltage, wherein the reverse current detection signal is generated by the reverse current detection comparator, wherein a propagation delay time of the reverse current detection comparator is shorter than a propagation delay time of the correction comparator.

In the power supply control device according to the above-described fifth configuration, it may be configured, as sixth configuration, so that: the correction comparator and the reverse current detection comparator are formed so that a maximum value of an input offset voltage of the correction comparator is smaller than a maximum value of an input offset voltage of the reverse current detection comparator.

Consequently, the offset voltage can be adjusted to the optimum voltage with sufficient accuracy, without requiring a high-speed and highly accurate comparator.

In the power supply control device according to the above-described second configuration, it may be configured, as seventh configuration, so that: the offset correction circuit (35A) includes a sample-and-hold circuit (37) connected to the switch terminal and configured to sample the switch voltage and hold the switch voltage at the specific timing, and a correction amplifier (39) configured to output a signal proportional to a difference between the voltage held by the sample-and-hold circuit and the voltage of the ground, wherein the offset voltage is corrected on the basis of the output signal from the correction amplifier.

In an eighth configuration, a switching power supply apparatus according to one aspect of the present disclosure includes: a power supply control device according to any one of the above-described first to seventh configurations; and a rectifier/smoothing circuit including the coil and the capacitor, and configured to generate the output voltage by rectifying and smoothing the switch voltage.

What is claimed is:

1. A power supply control device provided in a switching power supply apparatus configured to generate an output voltage from an input voltage, the power supply control device configured to control an operation of the switching power supply apparatus, the power supply control device comprising:

an output stage including a first transistor provided between an application end of the input voltage and a switch terminal, and a second transistor provided between the switch terminal and a ground;

a switching control circuit configured to perform switching driving to alternately turn on and turn off the first transistor and the second transistor in accordance with the output voltage; and a light-load support circuit, wherein the output voltage is generated by rectifying and smoothing a switch voltage occurring at the switch terminal by a coil provided between the switch terminal and an application end of the output voltage and a capacitor provided between the application end of the output voltage and the ground, wherein the light-load support circuit includes a reverse current detection circuit configured to output a reverse current detection signal when a magnitude of the switch voltage is lower than an offset voltage during an on period of the second transistor, and an offset correction circuit, wherein the switching control circuit switches the second transistor from off to on through the switching driving, and then switches the second transistor off when the reverse current detection signal is received from the reverse current detection circuit, thereby setting the output stage as a specific state in which both the first transistor and the second transistor are off, wherein the offset correction circuit corrects the offset voltage on the basis of the switch voltage at a specific timing when the output stage is switched from a state where the second transistor is on to the specific state.

2. The power supply control device according to claim 1, wherein the offset correction circuit decreases the offset voltage when the switch voltage at the specific timing is lower than a voltage of the ground, and increases the offset voltage when the switch voltage at the specific timing is higher than the voltage of the ground.

3. The power supply control device according to claim 2, wherein the offset correction circuit comprises a sample-and-hold circuit connected to the switch terminal and configured to sample the switch voltage and hold the switch voltage at the specific timing, and a correction comparator configured to output a signal indicating a magnitude relationship between the voltage held by the sample-and-hold circuit and the voltage of the ground, wherein the offset voltage is corrected on the basis of the output signal from the correction comparator.

4. The power supply control device according to claim 3, wherein the offset correction circuit corrects the offset voltage to be decreased or increased by a predetermined unit correction amount on the basis of the output signal from the correction comparator at every switching period of the output stage in the switching driving.

5. The power supply control device according to claim 3, wherein the reverse current detection circuit includes an offset voltage output circuit configured to output the offset voltage, and a reverse current detection comparator configured to detect whether the magnitude of the switch voltage is lower than the offset voltage during the on period of the second transistor on the basis of the switch voltage and the offset voltage, wherein the reverse current detection signal is generated by the reverse current detection comparator, wherein a propagation delay time of the reverse current detection comparator is shorter than a propagation delay time of the correction comparator.

6. The power supply control device according to claim 5, wherein the correction comparator and the reverse current detection comparator are formed so that a maximum value of an input offset voltage of the correction comparator is smaller than a maximum value of an input offset voltage of the reverse current detection comparator.

7. The power supply control device according to claim 2, wherein the offset correction circuit comprises a sample-and-hold circuit connected to the switch terminal and configured to sample the switch voltage and hold the switch voltage at the specific timing, and a correction amplifier configured to output a signal proportional to a difference between the voltage held by the sample-and-hold circuit and the voltage of the ground, wherein the offset voltage is corrected on the basis of the output signal from the correction amplifier.

8. A switching power supply apparatus comprising:

a power supply control device according to claim 1; and a rectifier/smoothing circuit including the coil and the capacitor, and configured to generate the output voltage by rectifying and smoothing the switch voltage.

* * * * *